(12) United States Patent
Wright et al.

(10) Patent No.: US 12,198,110 B2
(45) Date of Patent: Jan. 14, 2025

(54) PARTITIONING A REQUEST INTO TRANSACTIONS FOR A BLOCKCHAIN

(71) Applicant: nChain Licensing AG, Zug (CH)

(72) Inventors: Craig Steven Wright, London (GB); Owen Vaughan, London (GB); Chloe Ceren Tartan, London (GB); Wei Zhang, London (GB)

(73) Assignee: nChain Licensing AG, Zug (CH)

( * ) Notice: Subject to any disclaimer, the term of this patent is extended or adjusted under 35 U.S.C. 154(b) by 273 days.

(21) Appl. No.: 17/761,166

(22) PCT Filed: Sep. 18, 2020

(86) PCT No.: PCT/IB2020/058704
§ 371 (c)(1),
(2) Date: Mar. 16, 2022

(87) PCT Pub. No.: WO2021/059098
PCT Pub. Date: Apr. 1, 2021

(65) Prior Publication Data
US 2023/0316241 A1    Oct. 5, 2023

(30) Foreign Application Priority Data
Sep. 23, 2019 (GB) .................... 1913667

(51) Int. Cl.
*G06Q 20/10* (2012.01)
*G06Q 20/38* (2012.01)
(52) U.S. Cl.
CPC ........... *G06Q 20/10* (2013.01); *G06Q 20/382* (2013.01)
(58) Field of Classification Search
CPC .............................. G06Q 20/10; G06Q 20/382
See application file for complete search history.

(56) References Cited

U.S. PATENT DOCUMENTS 10,915,895 B1 * 2/2021 Fogg .................. G06Q 20/0655
11,373,152 B2 * 6/2022 Wright .................... G06F 16/27
(Continued)

FOREIGN PATENT DOCUMENTS

WO    2019003072    1/2019
WO    2019053583    3/2019

OTHER PUBLICATIONS

Adreas Antonopoulos, "Mastering Bitcoin", Dec. 2014, O'Reilly Media, Inc.*
(Continued)

*Primary Examiner* — Steven S Kim
(74) *Attorney, Agent, or Firm* — Messner Reeves LLP

(57) ABSTRACT

In one aspect, the present disclosure proposes methods, devices and systems for partitioning a request associated with a digital asset into an arbitrary number of transactions. The partitioning is based on knowing or obtaining a maximum number of outputs allowed for a request and an arbitrarily selection of a possible integer partition of an arbitrarily selected integer. The randomly selected integer partition then forms the basis for determining the number of transactions and UTXOs, so that a digital asset value can be arbitrarily split across the determined UTXOs before being stored on a public blockchain. In another aspect, the present disclosure proposes methods, devices and systems for arbitrarily distributing a digital asset value associated with a request across an arbitrarily determined number of transactions. This is based on an arbitrarily selected number of transactions, and a maximum number of outputs allowed for each request. In another respect, the present disclosure proposes methods, devices and systems for generating or determining one or more public addresses associated with a given entity for use in blockchain transactions for the given entity, so that such addresses may be securely and correctly (Continued)

associated with the given entity, while maintaining anonymity of the entity's identity.

5 Claims, 9 Drawing Sheets

(56) References Cited

U.S. PATENT DOCUMENTS

| | | | | |
|---|---|---|---|---|
| 11,989,208 | B2* | 5/2024 | Douglass | G06Q 20/3678 |
| 2003/0046226 | A1* | 3/2003 | Iue | G06Q 40/02 |
| | | | | 705/39 |
| 2013/0238491 | A1* | 9/2013 | Bouey | G06Q 20/405 |
| | | | | 705/39 |
| 2018/0349896 | A1* | 12/2018 | Arora | G06Q 20/3829 |

OTHER PUBLICATIONS

Bonneau et al., "Mixcoin Anonymity for Bitcoin with accountable mixes", (Full version), Financial Cryptography and Data Security, 18th International Conference, FC 2014, Mar. 3-7, 2014, Revised Selected Papers, Jan. 1, 2014, pp. 1-25, Christ Church, Barbados.*
Mike Hearn, Merge Avoidance, A note on privacy-enhancing techniques in the Bitcoin protocol, Mike's blog, pp. 1-8, Dec. 11, 2013, https://blog.plan99.net/merge-avoidance-7f95a386692f.
PCT/IB2020/058704 International Search Report and Written Opinion dated Feb. 9, 2021.
GB1913667.0 Combined Search and Examination Report dated Feb. 26, 2020.

* cited by examiner

| k | Number of Partitions | k | Number of Partitions | k | Number of Partitions | k | Number of Partitions | k | Number of Partitions |
|---|---|---|---|---|---|---|---|---|---|
| 1 | 1 | 11 | 56 | 21 | 792 | 31 | 6842 | 41 | 44583 |
| 2 | 2 | 12 | 77 | 22 | 1002 | 32 | 8349 | 42 | 53174 |
| 3 | 3 | 13 | 101 | 23 | 1255 | 33 | 10143 | 43 | 63261 |
| 4 | 5 | 14 | 135 | 24 | 1575 | 34 | 12310 | 44 | 75175 |
| 5 | 7 | 15 | 176 | 25 | 1958 | 35 | 14883 | 45 | 89134 |
| 6 | 11 | 16 | 231 | 26 | 2436 | 36 | 17977 | 46 | 105558 |
| 7 | 15 | 17 | 297 | 27 | 3010 | 37 | 21637 | 47 | 124754 |
| 8 | 22 | 18 | 385 | 28 | 3718 | 38 | 26015 | 48 | 147273 |
| 9 | 30 | 19 | 490 | 29 | 4565 | 39 | 31185 | 49 | 173525 |
| 10 | 42 | 20 | 627 | 30 | 5604 | 40 | 37338 | 50 | 204226 |

Figure 2

PARTITIONING A REQUEST INTO TRANSACTIONS FOR A BLOCKCHAIN

TECHNICAL FIELD

This disclosure relates generally to methods and systems for increasing the privacy and security of transactions associated with a distributed ledger. The disclosure is particularly suited, but not limited to applications relating to transfer of digitals assets pertaining to one or more entities using a public blockchain, whilst maintaining the anonymity and increasing the security associated with the entities involved in the transfer.

BACKGROUND

In this document we use the term blockchain' to include all forms of electronic, computer-based, distributed ledgers. These include consensus-based blockchain and transaction-chain technologies, permissioned and un-permissioned ledgers, shared ledgers, public and private blockchains, and variations thereof. The most widely known application of blockchain technology is the Bitcoin ledger, although other blockchain implementations have been proposed and developed. While Bitcoin may be referred to herein for the purpose of convenience and illustration, it should be noted that the disclosure is not limited to use with the Bitcoin blockchain, and alternative blockchain implementations and protocols associated with ant kind of digital asset or a representation of a digital asset fall within the scope of the present disclosure. The terms "entity", "node", "user", "sender", "recipient" may refer herein to a computing or processor-based resource. The term "Bitcoin" is used herein to include any version or variation that derives from or is based on the Bitcoin protocol. The term "digital asset" may refer to any transferrable asset such as cryptocurrency, tokens representing at least a part of a property, a smart contract, a license, i.e. software licence, or DRM contracts for media content etc. It will be understood that the term digital asset is used throughout this document to represent a commodity that may be associated with value that may be transferred to or provided as a payment in a transaction from one entity to another.

A blockchain is a peer-to-peer, electronic ledger which is implemented as a computer-based decentralised, distributed system made up of blocks which in turn are made up of transactions. Each transaction is a data structure that encodes the transfer of control of a digital asset between participants in the blockchain system and includes at least one input and at least one output. Each block contains a hash of the previous block to that blocks become chained together to create a permanent, unalterable record of all transactions which have been written to the blockchain since its inception. Transactions contain small programs known as scripts embedded into their inputs and outputs, which specify how and by whom the outputs of the transactions can be accessed. On the Bitcoin platform, these scripts are written using a stack-based scripting language.

In order for a transaction to be written to the blockchain, it must be "validated". Network nodes (miners) perform work to ensure that each transaction is valid, with invalid transactions rejected from the network. Software clients installed on the nodes perform this validation work on an unspent transaction (UTXO) by executing its locking and unlocking scripts. If execution of the locking and unlocking scripts evaluate to TRUE, the transaction is valid, and the transaction is then written to the blockchain. Thus, in order for a transaction to be written to the blockchain, it must be i) validated by the first node that receives the transaction—if the transaction is validated, the node relays it to the other nodes in the network; and ii) added to a new block built by a miner; and iii) mined, i.e. added to the public ledger of past transactions.

Once stored in the blockchain as a UTXO, a user can transfer control of the associated resource to another address associated with an input in another transaction. This transfer is usually done using a digital wallet. This digital wallet may be a device, physical medium, program, application (app) on a computing device such as a desktop, laptop or a mobile terminal, or a remotely hosted service associated with a domain on a network work, such as the Internet. The digital wallet stores public and private keys and can be used to track ownership of resources, tokens and assets etc. associated with a user, receive or spend digital assets, transfer tokens which may relate to digital assets such as cryptocurrencies, or licences, or property or other types of resource.

Public blockchains serve as an immutable distributed data storage system that leverages both cryptography and economic incentives for security. Blockchain technology is widely known for its use in relation to digital assets. As mentioned above, outputs or UTXOs relating to a transaction are provided or stored on a blockchain. These transactions can thus be viewed or accessed by parties with access to the blockchain, and usually include details such as public address or public key for at least one entity, as well as an indication of a digital asset or value of an asset or token transferred. Although some elements of the transactions can be masked or encrypted (and this is usually done), the idea of a public distributed ledger is that public addresses and keys etc. are used, so that such transactions can be verified by the nodes of a blockchain network. Therefore, although an immutable and verifiable/auditable distributed storage is achieved, privacy of (the content of) transactions remains a concern for a number of applications and entities that utilise the blockchain. In addition, as existing techniques are based on knowledge of a public address or public key for a given entity or entities, the identity of the entity in question remaining anonymous is also a concern. This is especially the case if an entity receives or sends a certain value associated with the digital asset or token for a number of transactions, i.e. like a merchant entity that sells one type of product for a fixed value of cryptocurrency, and always requests such fixed value using one or more known public keys. Such entity can be susceptible to impersonation, message replay or eavesdropping related attacks that comprise the security, anonymity and privacy of the entity and related transactions, if such details can be deduced from the public blockchain by a malign party.

The present disclosure addresses these technical concerns by proposing techniques by which the security, privacy and anonymity associated with a given entity, as well as the transactions relating to the entity can be significantly increased. This is based on changing the manner and structure in which transactions relating to a transfer of a digital asset between entities are provided to/stored on a public blockchain, such as the Bitcoin blockchain, by partitioning data relating to the transfer completely arbitrarily. This randomness is achieved based on intermediate selections that are also performed arbitrarily.

SUMMARY

In one aspect, the present disclosure proposes methods, devices and systems for partitioning a request associated with a digital asset into an arbitrary number of transactions. The partitioning is based on knowing or obtaining a maximum number of outputs allowed for a request and an arbitrarily selection of a possible integer partition of an arbitrarily selected integer. The randomly selected integer partition then forms the basis for determining the number of transactions and outputs (UTXOs), so that a digital asset value can be arbitrarily split across the determined UTXOs before being stored on a public blockchain.

In another aspect, the present disclosure proposes methods, devices and systems for arbitrarily distributing a digital asset value associated with a request across an arbitrarily determined number of transactions. This is based on an arbitrarily selected number of transactions, and a maximum number of outputs for each request.

In another aspect, the present disclosure proposes methods, devices and systems for generating or determining one or more public addresses associated with a given entity for use in blockchain transactions for the given entity, so that such addresses may be securely and correctly associated with the given entity, while maintaining anonymity of the entity's identity.

Throughout this specification the word "comprise", or variations such as "includes", "comprises" or "comprising", will be understood to imply the inclusion of a stated element, integer or step, or group of elements, integers or steps, but not the exclusion of any other element, integer or step, or group of elements, integers or steps.

BRIEF DESCRIPTION OF THE DRAWINGS

Aspects and embodiments of the present disclosure will now be described, by way of example only, and with reference to the accompany drawings, in which:

FIG. 2 is a table showing the number of possible integer partitions for each integer k where $1 \leq k \leq N$ and where N=50.

DETAILED DESCRIPTION

Figure 1A:
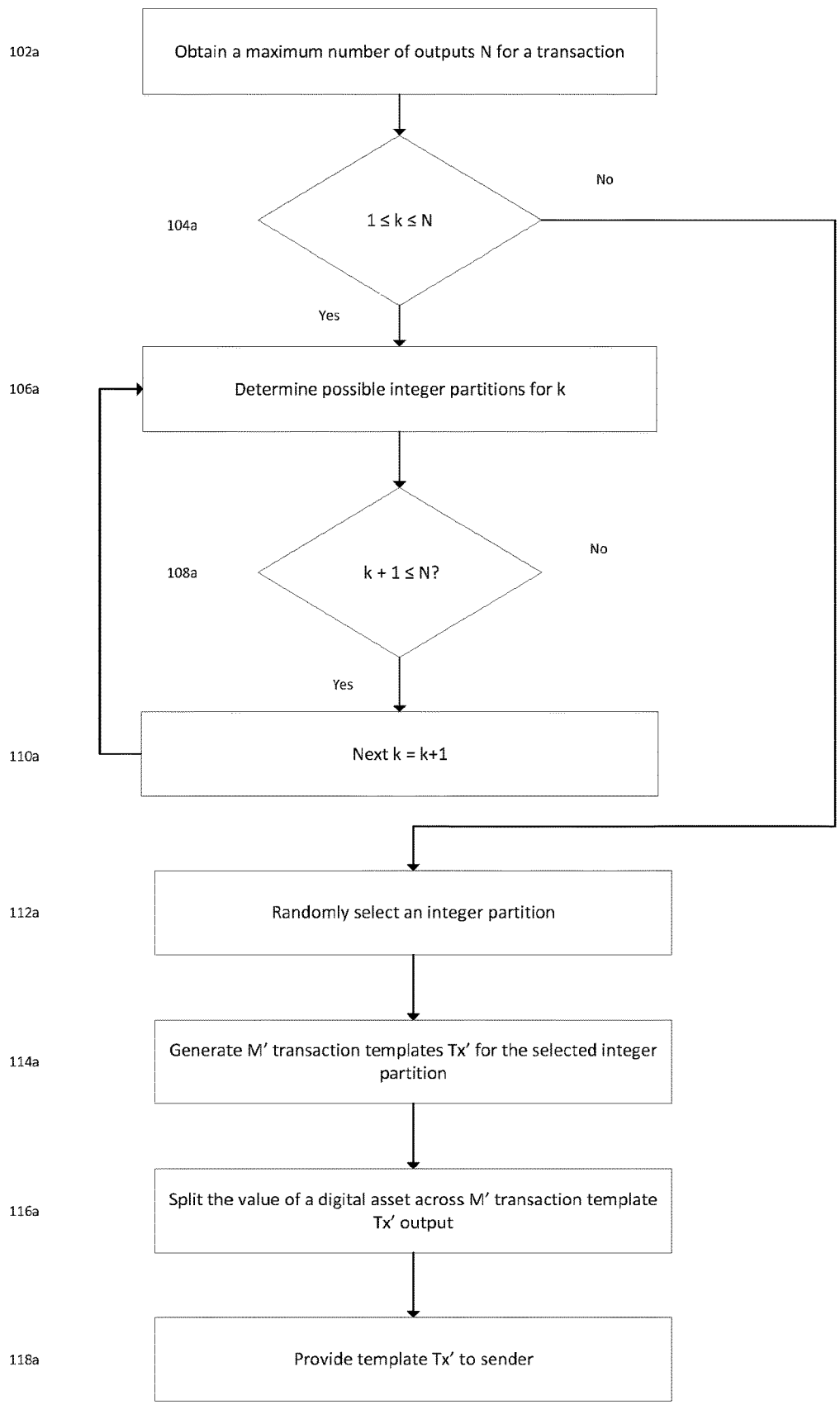
FIG. 1a is a flow diagram depicting a method for partitioning a request associated with a digital asset into an arbitrary number of transactions according to a first aspect, the method being performed by one or more processors associated with a recipient of the digital asset payment.

In accordance with a first aspect, the present disclosure provides a computer implemented method of partitioning a request associated with a digital asset into one or more transactions pertaining to a distributed ledger, each transaction having one or more outputs associated with the request, the method implemented by one or more processors associated with a recipient, where the recipient may be a computing resource or a node or entity that may be associated with a digital wallet. In some embodiments, the request may be a request for payment or a trigger or message to indicate that a payment associated with a value or amount of a digital asset is required. The method includes the steps of obtaining a maximum number of outputs N possible for a request associated with the recipient. In some embodiments, the maximum number of outputs N is predefined for either the request or the recipient. In some embodiments the maximum number of outputs (N) may be the maximum outputs in total for all transactions that are associated with the request. In some embodiments, the maximum number of N outputs relate to public addresses for the recipient. For example, the recipient or the recipient's wallet decide N to be applied for all requests or may arbitrarily choose N based on one or properties of the request. For instance, requests for a digital asset meeting a value threshold may have a different value for N, when compared to the requests that do not meet the threshold. Then, for each integer k where $1 \leq k \leq N$, all possible integer partitions are determined. An integer partition is then arbitrarily selected from the possible integer partitions for the request.

The method of the first aspect includes generating one or more (M') transaction templates Tx' based on the selected integer partition. In some embodiments, the transaction templates provided by the recipient includes all details needed for a sender or another entity to make a digital asset payment to the recipient, such as the public key or address for the recipient in the output scripts (UTXO), as well as the value of the digital asset and any digital signature that is to be applied based on existing Public key infrastructure (PKI) protocols. The method includes splitting a value associated with the digital asset across the output(s) associated with the one or more generated transaction templates Tx', and providing for or to a sender, the one or more generated transaction templates Tx'. For example, the digital asset requested may be a cryptocurrency payment in BSV In some embodiments the transaction templates Tx' may be sent directly to the processors or wallets associated with the sender. In other embodiments, the templates may be sent to a payment service that may be associated with the sender, or may be stored on the blockchain, i.e. the distributed ledger, for retrieval by the sender In some embodiments, the method includes the step of receiving one or more completed transactions Tx based on the one or more generated templates Tx' from the sender. The recipient can then submit the completed transactions to the distributed ledger. In some embodiments, this submission may take place after known methods of verification using PKI techniques.

Advantageously, the above method of the first aspect enables a complete randomisation of the process of requesting a digital asset payment by using transaction templates or a similar mechanism for providing output scripts to receive a digital asset. The arbitrary selection from an arbitrary number of possible partitions significantly reduces the probability of these transaction being traced back to or associated with a particular entity, thereby increasing the privacy of corresponding transactions when posted on a blockchain. Advantageously, this method also increases anonymity for the recipient, which in turn provides greater security against malign parties considering attacks by eavesdropping to identify or intercept a recipient's transactions on the blockchain. This may be in order to observe patterns in the transaction output addresses or the digital asset values or known distributions associated with the request. This deduction by a malign party by observing the blockchain will now be incredibly difficult, given the random number of transactions templates and outputs for a single request from the recipient entity. The method also provides security against MITM or message replay attacks, which may involve a malign party impersonating either the sender or the recipient in the middle to change or intercept some of the data between two corresponding parties. This is because it will now be difficult to associate a transaction based on the arbitrarily generated transaction templates to a given entity or node.

The method of a first aspect may also be implemented by one or more processors associated with a sender or in some cases a third part entity that may be associated with a sender that may provide a service to implement the method of the first aspect of the present disclosure. In this case, the sender performs the method responsive to receipt of a request or a trigger to make a digital asset payment associated with a recipient. In some embodiments this request may be received from the recipient or may be automatically generated by one or more processors or a digital wallet associated with the sender following an indication of an intent to purchase one or more goods or services from then recipient. As with the above described method, a maximin number of outputs (N) possible for a request associated with the recipient is obtained. For each integer k where $1 \leq k \leq N$, possible integer partitions are determined, and an integer partition is arbitrarily selected from the determined possible integer partitions for the request. The sender then generates one or more transactions Tx based on the selected integer partition. The method then includes splitting a value associated with the digital asset across the output(s) associated with the one or more generated transactions, where each output pertains to a public address or a public key associated with the recipient.

The above method differs from the method of the first aspect implemented by a recipient by straightaway generating the transactions for the request, which can be provided to the public blockchain, rather than requiring a transaction template. Since the sender is implementing the method for making a payment for the recipient entity, no templates are needed. The above method of the first aspect when implemented by the sender provides all advantages of the first aspect discussed above, and additionally provides the advantage if enabling or facilitating such partitioning to be provided for one or more recipients or nodes that may not be able to or may not have the resources to generate transaction templates as described above. Also, in a number of merchant supply chains, the sender may be a large entity making a purchase from a small supplier (recipient). In this scenario, the sender can then implement this method as a payment security service to smaller, less computationally sophisticated suppliers or recipients. Furthermore, by enabling the method to be performed by processors at the sender end or the recipient end, interoperability can be achieved for digital asset payments based on one or more requirements that are specified for the recipient entity.

In some embodiments, the recipient or sender may be an entity that relates to or implemented by one or more computing resources, user terminals or applications associated with a computing resource. In some embodiments, usually each (sender or receiver) entity may be associated with a digital wallet or may be an entity that is associated with a digital wallet, such as a user terminal having a digital wallet or application for a digital wallet installed. Although the aspects and embodiments of the present disclosure relate to the recipient entity or the sender entity digital wallets, it is to be understood that entities not having a digital wallet or a separate application for one, but which are configured to provide the functionality for operating as or with or similar to digital wallet are also within the scope of this disclosure. For ease of explanation alone, the following description relate to recipients and senders, and the disclosure is in no way limited to entities with digital wallets.

When implemented by the sender, in some embodiments the method of the first aspect further comprises generating or determining the one or more public addresses associated with the recipient based on the selected integer partition, a given public address among the one or more public addresses being assigned to a given output of a given transaction Tx among the one or more generated transactions. If the recipient is a computationally unsophisticated entity, this embodiment advantageously enables the generation of public addresses for securely receiving payment to be carried out at a different entity, so that the recipient and the transaction can benefit from the advantages of increased security, privacy and anonymity In some embodiments, when implemented by the sender, the method comprises sending the one or more generated transactions Tx to the recipient. In some embodiments the generated transactions may include a digital signature associated with the sender, which can be verified at the recipient end. This is advantageous as the responsibility of submitting to the blockchain is now provided to the recipient, and the recipient is aware of the transactions that have been completed for the request for payment. In other embodiments, the generated transactions Tx can be submitted to the distributed ledger by the sender, so that the UTXOs are posited to the blockchain and thus visible, rather than sending it to the recipient.

The following embodiments relate to the first aspect of randomly partitioning a request over an arbitrary number of transactions and/or outputs on a blockchain and related to the method when implemented by the recipient or the sender. As mentioned above, the embodiments relating to generating transaction templates relate to the recipient implementation while those relating to the generation of transactions relate to the sender implementation.

In some embodiments, the number of transaction templates M' or the number of transactions M generated is based on the number of integers in the selected integer partition. In some embodiments, a number of outputs in a given transaction template Tx' or transaction Tx generated is based on a value of an integer at a respective position in the selected integer partition that relates to the given transaction Tx or template Tx'. For instance, if N=5 and if the arbitrarily selected integer partition relating to integer k=3 is 2+1, this implies that there are two transactions/templates TxID1 and TxID2, where TxID1 has two outputs for the recipient and TxID1 has one output. This embodiment is further described below in relation to FIGS. 1a and 1b.

Advantageously, the above embodiments specify further implementation details on how the structure and granularity of the transactions and outputs are arbitrarily selected, based on knowing only one value, i.e. the maximum number of outputs N for a request that is associated with the recipient. The outputs are associated with a public key or address for the recipient.

In some embodiments, the method includes obtaining a maximum number of transaction templates $M'_{max}$ or a maximum number of transactions $M_{max}$ allowed for the request or the recipient.

This advantageously ensures processing resource optimisation, thereby reducing the overheads of having too many transactions, while still gaining the benefits of increased security, privacy and anonymity provided for the recipient by the random partitioning of the first aspect.

In some embodiments, the method comprising obtaining a minimum number of transaction templates $M'_{min}$ or transactions $M_{min}$, and/or a minimum number of outputs $N_{min}$ for the request or the recipient.

This advantageously avoids trivial integer partition possibilities to be considered, that may result in transactions that appear and behave like a normal or existing blockchain transaction, such as having a single transaction with one output.

In some embodiments, each output in a given transaction template Tx' or Transaction Tx generated is associated with a different public address for the recipient node, the public address being specific to a respective output.

This advantageously ensures that each output is associated with a different public key or address for the recipient, which aids in increasing the security and the anonymity for the recipient, as the transaction for the same recipient and the same request will appear more random and unrelated to a malign party trying to observe and identity transaction for a particular request or recipient.

When the method of the first aspect is implemented by the recipient, then the method carried out by one or more processors of sender entity to complete a digital asset payment includes the steps of obtaining or identifying one or more transaction templates Tx' associated with the request, the templates Tx' associated with the recipient and generated based on the method of the first aspect and related embodiments when implemented by the recipient as set out above. The method further includes completing the one or more templates Tx' to create the corresponding blockchain transactions Tx for the payment and providing the corresponding transactions Tx to the sender for submitting to the blockchain, or alternatively submitting the corresponding transactions to the distributed ledger.

When the method of the first aspect is implemented by a sender, then the method carried out by one or more processors of recipient of a digital asset payment includes the steps of providing the request associated to a sender. In some embodiments, this may be a separate message or indicator sent on or off-chain to the sender. The method includes receiving one or more completed transactions Tx from the sender, the one or more completed transaction generated based on the method of the first aspect and embodiments when implemented by the sender; and then submitting the completed transactions to the distributed ledger.

In accordance with a second aspect, the present disclosure provides a computer implemented method of distributing a request over one or more transactions pertaining to a distributed ledger, each transaction having one or more outputs associated with the request, the method being implemented by one or more processors associated with a recipient. The method includes the steps of obtaining a value L associated with the request, wherein the value is representative of a digital asset requested by the recipient. The method includes obtaining a predetermined number of transaction templates M' associated with the request, wherein the M' templates Tx' are associated with a predetermined maximum number of outputs N pertaining the request or the recipient, a given transaction template Tx' among the M' transaction templates Tx' having n outputs, where n≤N . . . In some embodiments, this step of obtaining is based on the method of the first aspect, when implemented by the recipient to obtain N and M'. The method of the second aspect then comprises arbitrarily generating n−1 number of value partitions $U_{(i=1\ to(n-1))}$ of the value L, and sorting the n−1 value partitions in ascending order of value $0 < U_{(1)} < U_{(2)} < \ldots < U_{(n-1)} < L$, where $U_{(0)} = 0$ and where $U_{(n)}L$. The method then comprises computing a value $X_{(i=1\ to\ M')}$ for a given transaction among the predetermined number of transaction templates M' based on a difference between a respective ($i^{th}$) value partition and a previous value partition in the sorted order $X_i = U_{(i)} - U_{(i-1)}$ for i=1 to n In addition to the advantages discussed for the first aspect, the method of the second aspect advantageously further increases privacy and the chances of the recipient remaining anonymous. The arbitrarily splitting the value of the digital asset into random denominations for including in a number of arbitrarily generated transaction above discussed method of the second makes it difficult for an observer or malign party to associate a blockchain transaction with a recipient based on a knowledge or deduction of a value of the digital asset or usual or previously used denominations associated with that recipient for accepting digital asset payments. This in turn further increases the security of transactions on the blockchain, as it is now incredibly difficult for a malign party to guess or compute any meaning or the source identity from looking at the values in the outputs of a given transaction in the blockchain.

In some embodiments, the method of the first aspect and the method of the second aspect may be combined and implemented by the recipient, where the step of splitting in the first aspect may be implemented by the steps of the second aspect.

The method of a second aspect may also be implemented by one or more processors associated with a sender. In this case, the method is performed by the responsive to receipt of a request or a trigger to make a digital asset payment associated with a recipient. In this case, the method as implemented by the sender includes obtaining a value L associated with the request, wherein the value is representative of a digital asset, and obtaining a predetermined number of transactions M associated with the request, the M transactions Tx are associated with a predetermined maximum number of outputs N pertaining the request or the recipient, a given transaction Tx among the M transactions Tx having n outputs, where n≤N;

In some embodiments, the step of obtaining is carried out based on the method of partition a request over a number of transactions and outputs arbitrarily, as explained in the first aspect when implemented by the sender. As discussed in relation to the first aspect, the sender implementation differs from the recipient implementation in that transaction templates Tx's are not required given that it is the sender that will be partitioning the request for the recipient. The method of the second aspect the includes arbitrarily generating n−1 number of value partitions $U_{(i=1\ to(n-1))}$ of the value L, and sorting the n−1 value partitions in ascending order of value $0<U_{(1)}<U_{(2)}< \ldots <U_{(n-1)}<L$, where $U_{(0)}=0$ and where $U_{(n)}=L$. The method then comprises computing a value $X_{(i=1\ to\ M)}$ for a given transaction among the predetermined number of transactions M based on a difference between a respective ($i^{th}$) value partition and a previous value partition in the sorted order $X_i=U_{(i)}-U_{(i-1)}$ for i=1 to n.

The sender implementation provides the same advantages associated with the second aspect as discussed above for the recipient implementation. In addition, similar to the first aspect, such implementation advantageously allow a computationally unsophisticated recipient to ensure that privacy security and anonymity of payment transaction meant for it can still be achieved from another entity that can implement the arbitrary partitioning into transactions for a requested on its behalf.

In accordance with a second aspect, the present disclosure provides a computer implemented method of for generating a plurality of public keys associated with a recipient, each public key associated with one or more blockchain transaction outputs (UTXOs) for one or more transactions associated with the recipient, the method being implemented by one or more processors that may be associated with either a sender or a recipient of a digital asset payment or a trusted third party. The method comprises the step of obtaining a parent public key $P_B$ based on a private key $S_B$ associated with a recipient, and a code C that is in some embodiments associated with the recipient and may be a chain code. The method includes deriving a plurality (n number of) of child public keys $P_{Bi(i=1\ to\ n)}$, each one ($i^{th}$) based on a respective derived child secret key $S_{Bi(i=1\ to\ n)}$ In the third aspect, each derived child public key $P_{Bi}$ represents a derived public address that is specific to one or more blockchain transaction outputs (UTXOs) that can be associated with the recipient.

In some embodiments, the parent public and/or private key are stable elliptic curve digital signature algorithm (ECDSA) key, i.e. a valid point on the secp256k1 curve, compressed, and hex encoded. In this case, in some embodiments the parent public key $P_B$ can be derived based on $P_B=S_B\cdot G$, where G is a generator or base point on the elliptic curve of bitcoin generator, or wherein the G is a known constant. In some embodiments a corresponding ($i^{th}$) child public key and child secret key can then be derived, based on the above, making use of a secure hash algorithm. This derivation is discussed below in relation to FIG. 6

Advantageously the method according to the third aspect enables the secure creation of a number of public addresses represented by public keys that are linked to a given entity. In the above case, this will be recipient of a payment of digital asset. This ensures that these addresses can be easily identified or determined on the blockchain by the recipient based on the parent key ($S_B$) and code (C). This is particularly advantageous when the identifying transactions that have are partitioned arbitrarily on the blockchain based on a request in the first and/or second aspect. The addressed derived according to the third aspect can be used in the outputs associated with the generated transactions for the partitioned requests. This then advantageously provides a mechanism to be able to validly link these arbitrarily generated transactions to a common factor, i.e. the recipient. This is particularly useful when an authorised party wishes to determine which of the partitioned transactions related to the recipient. This can be done by deriving and looking for the addresses based on the above method.

In some embodiments, hardening of the child keypair can also be implemented as an added security feature should it be necessary to limit such derivation to the recipient alone. Advantageously, in cases where the child is hardened, then the knowledge of the child private key and chain code C is not enough to reconstruct the private key of the parent. No entity other than the recipient will then be able to construct child addresses as only the recipient will know the parent private key $S_B$.

In embodiments where the child keypair is not hardened any entity with the knowledge of public key $P_B$ and chain code C could construct the derived child addresses on the recipient's behalf (such as the sender or a trusted third party entity, for instance), if it needed for further verification purposes or as a double check or back up. This ensures that the transactions relating to the arbitrarily partitioned request can determined. This is because the other entity when securely provided with the above details can also construct the public addresses in a manner that is linked to the recipient. This can be a useful backup mechanism for determining transactions associated with the recipient, where it turns out the recipient itself may have been compromised or attacked by a malign party.

In some embodiments, the derivation of linked public addresses according to the third aspect may also be based on a message m that is associated with a request. This request may relate to the request that has been partitioned in the first and second aspect. In such cases, the derivation of the addresses will require knowledge of the message m as well. Details on how this derivation can be In addition to the advantages discussed above for the third aspect, by this embodiment the recipient or another entity can now identify all public addresses that may have been used for a particular request m on the blockchain based on the parent private key and code C. If the chain code C is shared then another entity, such as the sender, the sender can also use this to derive the public addresses. Additionally, a hash of the request m may also sent or stored with a trusted third party or authority for safekeeping (along with the recipient's parent public key) such as for disaster recovery purposes or to provide an additional layer of security—in case the recipient node has been attacked or compromised by a malign party. This is because a derivation based on m then provides a verifiable link for all transaction associated with the request from the recipient.

In some embodiments, the code C is a chain code that is secret or private to the recipient, and wherein the chain code C is optionally a secure hash of a secret seed associated with the recipient. In this case, only the recipient will be able to perform the method of the third aspect to derive the public addresses for the recipient or the request.

In some embodiments, the code C is a chain code that is shared with another entity, wherein the other entity is a sender of the digital asset associated with the request to the recipient, or wherein the other entity is a trusted third party associated with the recipient or the sender. In this case, the public addresses can be derived by the other parties as well as the recipient.

In some embodiments the code C is associated with a secret S that is shared by the recipient and another entity, and wherein the secret S is shared between the recipient and the other entity based on a known or predefined secure key exchange protocol based on the parent public keys for the sender and a recipient $P_A$ and $P_B$. In some embodiments, the shared secret S may be encrypted.

In addition to all the above advantages discussed for the third aspect, key derivations based on a shared secret that is common to both the sender and the receiver ensures that all blockchain transactions associated with the recipient and linked to a given sender for a given message m can be identified and verified as needed. Further, if the derived public keys are not hardened, then sender can also determine and verify the transactions based on the derived public keys for the recipient for a given message m.

In some embodiments a computing device comprising a processor and memory is provided, the memory including executable instructions that, as a result of execution by the processor, causes the device to perform the aspects and/or the embodiments discussed above.

In some embodiments, a computer-readable storage medium is provided, having stored thereon executable instructions that, as a result of being executed by a processor of a computer system, cause the computer system to perform the method of the aspects and/or the embodiments discussed above.

Some specific embodiments are now described by way of illustration with reference to the accompanying drawings, in which like reference numerals refer to like features.

First Aspect—Recipient Implementation

FIG. 1a is a flowchart depicting a method of partitioning a request according to the first aspect or the present disclosure. The request is associated with a digital asset into one or more transactions pertaining to a distributed ledger as implemented by one or more processors associated with a recipient.

For example only, and to aid description and illustration let us consider a scenario where a sender (A for Alice) purchases goods or a service from recipient (B for Bob). The recipient Bob will then send a request to the sender for 3 BSV. The request in this scenario is in the form of a transaction template Tx' for which Bob has populated some of the outputs, which will become a transaction once Alice has populated hers. An existing form of a template may be schematically depicted as:

| T × ID$_1$ (template) | | | | | |
|---|---|---|---|---|---|
| Input | | | Output | | |
| Index | Value | Unlocking script | Index | Value | Locking script |
| | | empty | 0 | 3 BSV | [Checksig $P_{B_1}$] empty |

In the above transaction template Bob has inserted one output address associated with him, $P_{B_1}$ with an output value of 3 BSV.

In this scenario, let us consider that Alice has one UTXO with the value of 4 BSV at her address $P_{A_1}$. She can then insert this in the input of the transaction template and in the output, she sends 1 BSV to herself in change (balance amount) at another of her addresses $P_{A_2}$. The transaction is now complete and is schematically given by

| T × ID$_1$ | | | | | |
|---|---|---|---|---|---|
| Input | | | Output | | |
| Index | Value | Unlocking script | Index | Value | Locking script |
| 0 | 4 BSV | <Sig $P_{A_1}$> <$P_{A_1}$> | 0 | 3 BSV | [Checksig $P_{B_1}$] |
| | | | 1 | 1 BSV | [Checksig $P_{A_2}$] |

The above shows a standard transaction based on a request, which may be an invoice or a message, requesting payment of a digital assets, such as BSV or any other cryptocurrency. BSV will be referred to herein after for clarity and ease of reference, but the disclosure is not so limited.

As mentioned above, if a malign party on observing transactions deduces either from the value of 3 BSV that Bob usually charges or from a public key which represents a public address that Bob usually uses for receiving payment for the goods, it may be possible for the malign party to deduce the identity of Bob thereby compromising the anonymity of Bob, as well as the privacy of the transactions associated with Bob, as possibly Alice too—especially if Alice buys the same goods from Bob using the same public address at regular intervals, as these public addresses and keys are masked on the blockchain. The overall security may also be compromised as once the identity of a node is known, the malign party can perform eaves dropper attacks by listening or gathering information relating to Bob for malign purposes. An example of this is a message replay attack where the attacker eavesdrops, obtains a copy of the message or transaction, and then re-uses the message at a later time in an attempt to trick any cryptographic protocol that is being used into thinking that a message or transaction may have originated from the original merchant or recipient, i.e. Bob. The malign party may also perform man in the middle attacks, by impersonating a true party and even tampering with the message or transaction.

The first aspect of the present disclosure overcomes the above drawbacks of lack of anonymity, privacy and security relating to existing transactions in respect of payment request from Bob (then recipient of the digital asset), by modifying the structure of a transaction template(s) Tx'. This is now discussed below with respect to FIG. 1a, when implemented by one or more processors of the recipient or the recipient's wallet (Bob's wallet).

Step 102a depicts the step of obtaining a maximum number of outputs N possible for a request associated with the blockchain that pertains to Bob, i.e. the maximum number of public addresses associated with Bob for the given request. This may be pre-set for all digital asset related requests or indeed transactions related to Bob or may be set to be a different number for each request, on an arbitrary basis. In some embodiments, it is also possible to obtain a maximum or minimum number of transactions allowed, or a minimum number of outputs for each transaction allowed, to control granularity on transactions submitted to the blockchain. However, this is not essential. The maximum number of outputs N is the only essential parameter that is required for the recipient.

Step 104a depicts the step of checking for a given integer k if 1≤k≤N. If this condition is true, then the method proceeds to step 106a. Otherwise, the method proceeds to step 112a.

Step 106a depicts determining possible integer partitions for each integer k where 1≤k≤N. An integer partition is a distinct combination of (unordered) numbers that sum to give k. For example, the integer partitions of k=3 and k=4 are 3,  
2 + 1,  
1 + 1 + 1, 4,  
3 + 1,  
2 + 2,  
2 + 1 + 1,  
1 + 1 + 1 + 1.

We see that there are 3 possible integer partitions of 3, and 5 possible integer partitions of 4. The number of integer partitions does not scale linearly. The table in FIG. 2 sets out the number of partitions passible for each integer k 50.

Steps 108a and 110a indicates that step 106a is carried out for each integer k incrementally where the next k=k+1, as long as k+1≤N Step 112a depicts the step of arbitrarily selecting an integer partition n from the determined possible integer partitions for the request. Thus in this step, a single integer partition is selected or picked uniformly randomly from all possible partitions of each k satisfying 1≤k≤N. For instance, if we consider that N=4, a partition is selected from all partitions where k is 1,2,3 and 4. From the table in FIG. 2, this means there will be 5+3+2+1=11 possible partitions to choose from. For this example, let us consider that 2+2 is the chosen integer partition selected completely arbitrarily, for selected integer k=4, which in this case k=N as well, as the maximum number of outputs.

Figure 3:
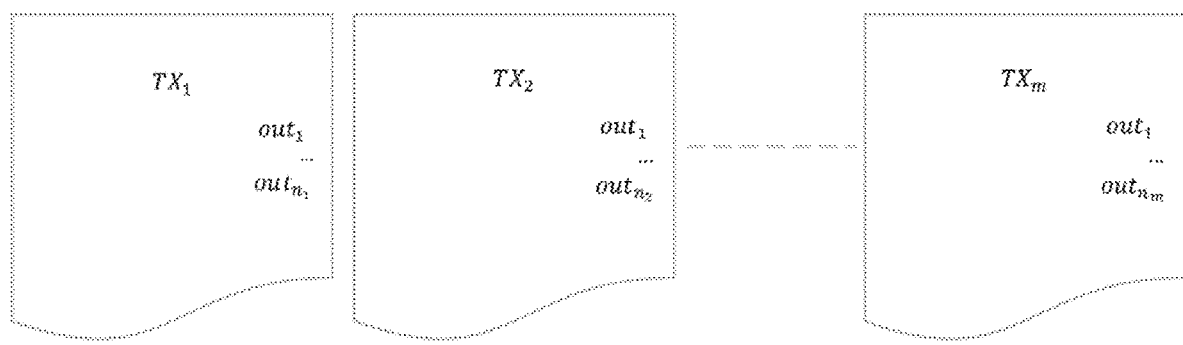
FIG. 3 is a schematic diagram depicting the arbitrarily selected M number of transactions for a request associated with the first aspect, each having a maximum of N outputs

Step 114a depicts the step of generating one or more, i.e. M' transaction templates Tx' based on the selected integer partition in step 112a, i.e. 2+2. The number of transaction templates M' generated is based on the number of integers in the selected integer partition, and the number of outputs in a given transaction template Tx' among the M' transaction templates Tx' generated is based on the value of an integer at a respective position in the selected integer partition. This step describes generation of M' transaction templates Tx' with a total of n actual outputs in each template Tx, where n≤N based on the selected integer partition Thus, this results M' transaction templates, each with a total of n outputs, where n≤N. Following the above example the actual number of outputs n in each transaction for the recipient Bob will be n=2 for both TxIDs. Thus the arbitrarily selected partition may be represented as $n_1+ \ldots +n_m=n$, where m=M' transaction templates when n is the integer k that corresponds to the selected integer partition where 1≤m≤n≤N. Thus, each term is interpreted as defining a transaction with $n_i$ outputs. That is, m=M' transaction templates will be constructed, and $i^{th}$ transaction or transaction i will have $n_i$ outputs for 1≤i≤m. This output is generally and schematically represented in FIG. 3.

In the above example, where the selected partition is 2+2, this means that M=2 since there two integers in the selected partition which means that there will be two transaction templates generated for the request. This also means that each of the templates will have 2 actual outputs n each, that relate to Bob(the recipient). In some embodiments, each of these outputs will associated with a public key $P_b$ that represents a public address for Bob, and in some embodiments each address will be different to the other addresses for Bob. A technique for securely deriving public keys for an entity is discussed in detail with respect to the third aspect of the present disclosure based on FIG. 6 described later on herein.

Step 116a depicts the step of splitting a value associated with the digital asset across the output(s) associated with the one or more generated transaction templates Tx' from step 106a above. In the above example, this value is 3BSV. The method of arbitrarily splitting the value and distributing it across the four outputs (two in each transaction TxID1 and TxID2) is explained in detail below with respect to FIG. 4a and the second aspect of the present disclosure. For now, considering that the value of 3BSV is arbitrarily split, The M' transaction templates Tx' from step 114a, where M'=2 for the arbitrarily selected partition 2+2, where the actual number of outputs n=2, for each of M' templates, and where k=N=4 is now schematically be shown as given below for the same request, i.e. where payment of 3 BSV is required from Alice:

| T × ID$_1$ | | | | | |
|---|---|---|---|---|---|
| Input | | | Output | | |
| Index | Value | Unlocking script | Index | Value | Locking script |
| | | | 0 | 1.3 BSV | [Checksig $P_{B_1}$] |
| | | | 1 | 0.7 BSV | [Checksig $P_{B_2}$] |
| T × ID$_2$ | | | | | |
| Input | | | Output | | |
| Index | Value | Unlocking script | Index | Value | Locking script |
| | | | 0 | 0.7 BSV | [Checksig $P_{B_3}$] |
| | | | 1 | 0.3 BSV | [Checksig $P_{B_4}$] |

Thus, instead of one output address for the payment in one transaction for Bob, this step results in the generation of M'=2 transaction templates for the request, each having 2 outputs, each output associated with a different public address for Bob, all while matching the conditions of N=4.

Step 118a depicts the step of providing to a sender (Alice), the one or more generated transaction templates Tx' that have been generated by Bob in the previous step. Although not shown in FIG. 1a, the sender Alice may also wish to use multiple addresses for herself for each transaction template as needed and may therefore complete the transaction templates for the request to create complete transactions for the blockchain. However, in the present embodiments, the maximum number of outputs N relates to the recipients' outputs and does not include Alice's outputs. The completed transactions that satisfy N=4 for the recipient addresses/outputs, i.e. the requirement set by the recipient for the request, is shown below, where Bob uses k=N=4 addresses and Alice uses 8 addresses for the payment of 3 BSV from Alice to Bob.

| T × ID$_1$ | | | | | |
|---|---|---|---|---|---|
| Input | | | Output | | |
| Index | Value | Unlocking script | Index | Value | Locking script |
| 0 | 1 BSV | <Sig $P_{A_1}$> <$P_{A_1}$> | 0 | 1.3 BSV | [Checksig $P_{B_1}$] |
| 1 | 1.5 BSV | <Sig $P_{A_2}$> <$P_{A_2}$> | 1 | 0.7 BSV | [Checksig $P_{B_2}$] |
| | | | 2 | 0.5 BSV | [Checksig $P_{A_6}$] |
| T × ID$_2$ | | | | | |
| Input | | | Output | | |
| Index | Value | Unlocking script | Index | Value | Locking script |
| 0 | 0.6 BSV | <Sig $P_{A_3}$> <$P_{A_3}$> | 0 | 0.7 BSV | [Checksig $P_{B_3}$] |
| 1 | 0.4 BSV | <Sig $P_{A_4}$> <$P_{A_4}$> | 1 | 0.3 BSV | [Checksig $P_{B_4}$] |
| 2 | 0.5 BSV | <Sig $P_{A_5}$> <$P_{A_5}$> | 2 | 0.4 BSV | [Checksig $P_{A_7}$] |
| | | | 3 | 0.1 BSV | [Checksig $P_{A_8}$] |

When compared to the standard existing transactions associated with a payment of a digital asset on a public blockchain, the above arbitrarily selected M' transactions with arbitrarily selected outputs for Bob that less than or equal to N makes it harder for a single invoice to be identified on the public blockchain and attributed to either Alice or Bob.

Depending on the nature of the interaction, Alice may give the completed transaction to Bob who then submits it to the blockchain or distributed ledger. In alternative implementations, Alice may submit the transaction herself to the network. Either way, both parties may check that the transaction has been received and validated by miners, and ultimately mined into the blockchain. The validation and mining process is beyond the scope of this disclosure and will not be discussed here. However, it is understood that known techniques of validation, submission and mining transactions for the blockchain may be used and are so envisaged for the aspects and embodiments of the present disclosure.

First Aspect—Sender or Trusted Third-Party Implementation

Figure 1B:
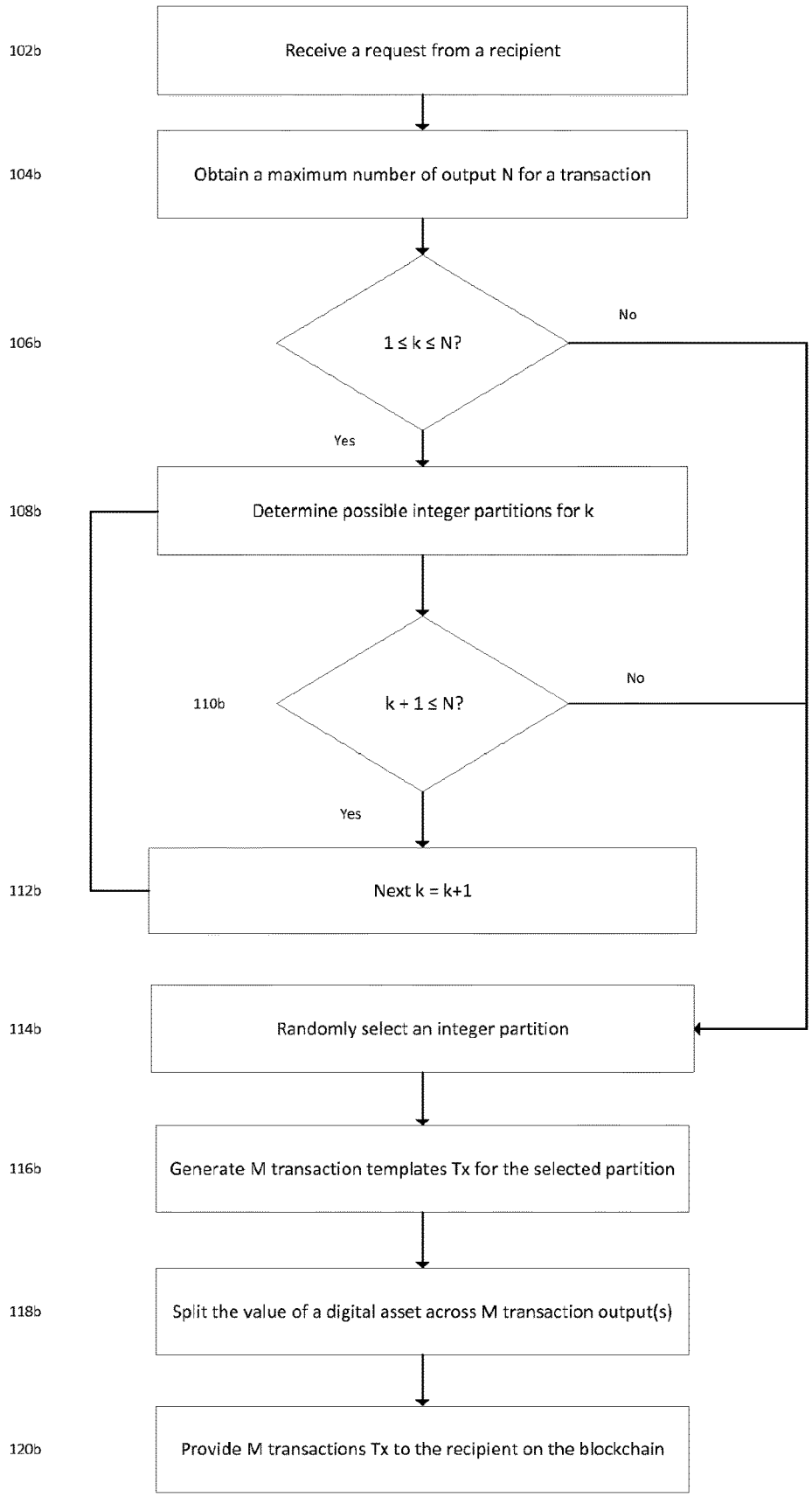
FIG. 1b is a flow diagram depicting a method for partitioning a request associated with a digital asset into an arbitrary number of transactions according to a first aspect, the method being performed by one or more processors associated with a sender of a digital asset payment.

FIG. 1b is a flowchart depicting a method of partitioning a request according to the first aspect of the present disclosure as implemented by one or more processors associated with a sender, i.e. Alice in relation to the above example scenario of paying 3BSV to Bob (the recipient. As discussed above, implementation of the method of the first aspect by one of more processors associated with a sender or indeed a trusted third party for portioning the request, so that it is split over multiple transactions and outputs, is advantageous for computationally unsophisticated recipients that may not be able to handle the processing associated with implementing the method themselves. For ease of reference, implementation by one or more processors or a digital wallet associated with the sender is discussed herein In step 102b, a request for a payment is received from or on behalf of the recipient. In the above example, this may be a notification or a message that 3BSV is due for goods or services purchased from Bob by Alice. In some embodiments, the request may represent an invoice.

Steps 104b to steps 114b will be implemented by the sender Alice in the same manner as described in steps 102a to steps 112a, respectively, but implemented by the sender. Therefore, these steps are not reiterated here to avoid repetition of same concepts of the first aspect.

Step 116b depicts the steps of generating one or more transactions Tx based on the selected integer partition. This step is also similar to the implementation discussed in relation to 114a, but instead of M' number of transaction templates, M number of transactions can be straightaway generated for the request in the sender implementation. This is because in this implementation no input or templates are sent from the recipient. This is also discussed above in the relevant embodiments associated with the first aspect. In some embodiments, the method also includes deriving one or more public addresses or public keys associated with the recipient Bob. The process of securely implementing such derivation by the sender or a trusted tired party is discussed in relation to the third aspect in FIG. 6.

In step 118b and 120b, splitting a value associated with the digital asset across the output(s) associated with the one or more generated transactions is carried out in the manner discussed in step 116a and 118a respectively, but implemented by the sender. Once the completed M transactions have been created, the sender can either submit this to the public blockchain or send it in a secure manner to the recipient for submission to the blockchain.

Second Aspect—Receiver Implementation

Figure 4A:
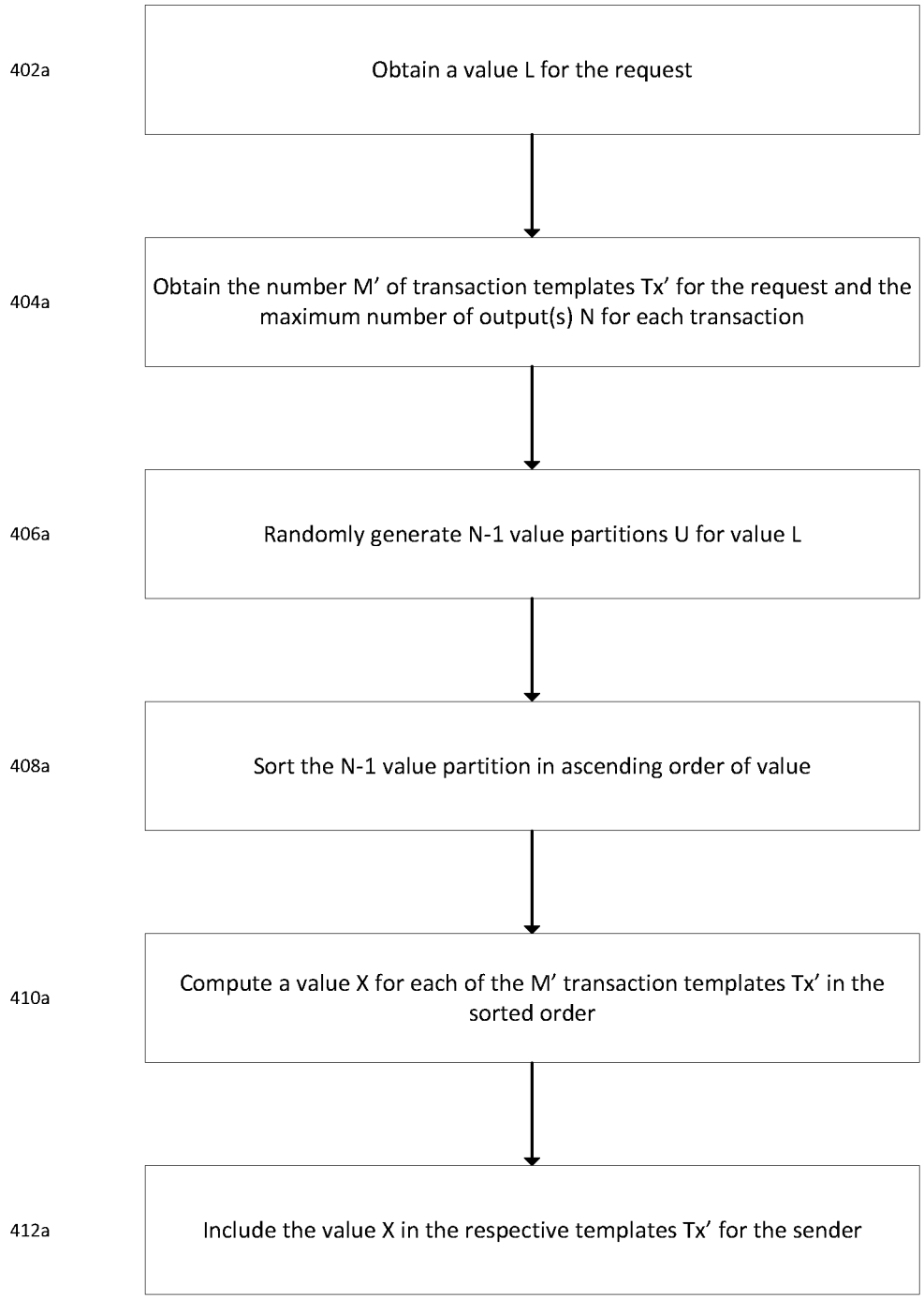
FIG. 4a is a flow diagram depicting a method for distributing a value of a request or a digital asset associated with the request over an arbitrarily selected number of transactions according to a second aspect, the method being performed by one or more processors associated with a recipient of a digital asset payment.

FIG. 4a is a flowchart depicting a method of distributing a value associated with request over a plurality of transaction outputs, according to the second aspect or the present disclosure. The request is associated with a digital asset. Following the same scenario explained in relation to the first aspect, the digital asset is BSV and the value is 3. In this figure, the method is implemented by one or more processors or a digital wallet associated with the recipient (Bob). In some embodiments, the method of the second aspect is used to implement the step of splitting the value of the transactions in Step 116a.

Step 402a depicts the step of obtaining a value L associated with the request, wherein the value is representative of a digital asset, such as BSV but is not limited to it.

Step 404a depicts the steps of obtaining a predetermined number of transaction templates M' associated with the request. As explained in relation to the first aspect, each transaction template Tx' is associated with a predetermined maximum number of outputs N pertaining to the request, the outputs being associated with the recipient. In some embodiments this step is related to such that it follows from or includes the steps 102a to 114a of FIG. 1a, for obtaining M' transaction templates, each of the M' transactions have n actual outputs associated with Bob, i.e. the recipient, where n≤N.

Step 406a depicts the step of arbitrarily generating n−1 number of value partitions $U_{(i=1 \ to(n-1))}$ of the value L. So if N is taken to be 4, then 3 partitions of the value i.e. L=3 in this case, is randomly generated. This may be in any arbitrary denominations of 0.1 or 0.5 etc.

In some embodiments, related to both sender and recipient implementations, the step of arbitrarily generating n−1 number includes uniformly randomly generate n−1 numbers with $10^{-8}$ precision $(U_1, U_2, \ldots, U_{N-1} \in (0,1))$.

Advantageously, the method of the second aspect can be adapted to different metrics and precision units based on the cryptocurrencies and digital assets that are to be transferred. In the above embodiment a satoshis to BSV (Bitcoin Satoshi Vision) based metric is shown, as the minimal unit is 1 satoshi $-10^{-8}$ BSV, where a satoshi is the smallest unit of account in 0.00000001 BSVs approximately. Ethereum or Ripple may have different precision metrics.

In step 408a, the n−1 value partitions are sorted in ascending order of value $0 < U_{(1)} < U_{(2)} < \ldots < U_{(n-1)} < L$, where $U_{(0)} = 0$ and where $U_{(n)} = L$. Other sorting orders may be considered, or the order may be random.

Step 410a depicts the step of computing a value $X_{(i=1 \ to \ M')}$ for each given transaction template among the predetermined number of transaction templates M'. This value is calculated based on a difference between a respective ($i^{th}$) value partition and a previous value partition in the sorted order. This is depicted by $X_i = U_{(i)} - U_{(i-1)}$ for i=1 to n Step 412a depicts the step of including the calculated values of X to complete each template, to form completed transactions and sending the completed transactions to the sender or submitting the completed transactions to the blockchain.

Considering the example discussed above, following the partitioning of the request into an arbitrary number of transactions and outputs using the method of the first aspect, and then splitting the value of the request arbitrarily using the method of the second aspect results in the request being split into M=2 transactions, each having n=2 outputs, where the total number of outputs N associated with the recipient is no more than 4 as previously discussed.

Figure 5:
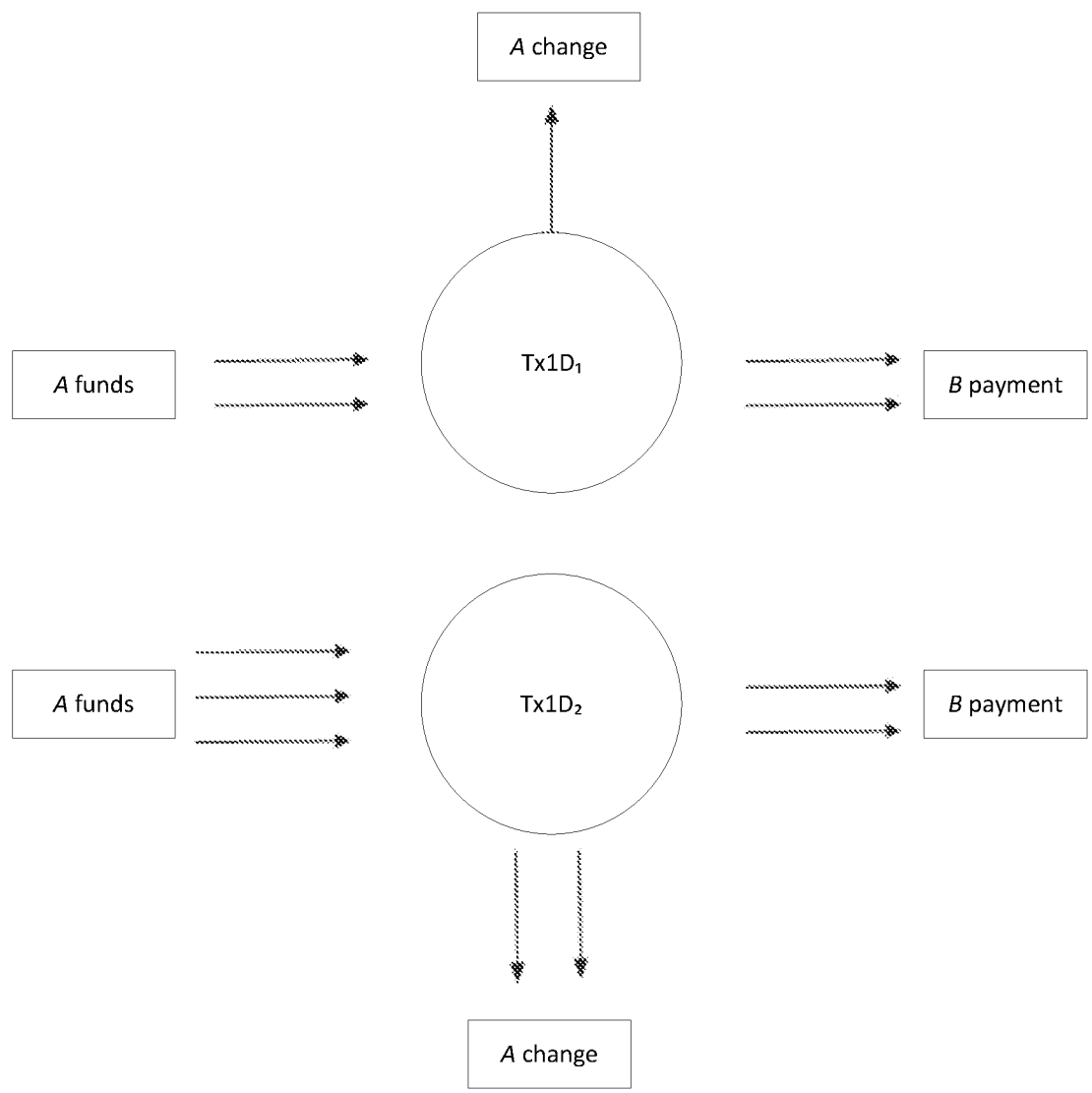
FIG. 5 is a schematic diagram depicting arbitrarily selected M number of transactions generated for a given request, each transaction associated n outputs where $1 \leq n \leq N$

Thus, following the above example of a request of 3 BSV, rather than a single transaction with one address for the recipient Bob, we now have a situation where Alice has spent 4 BSV in the inputs, Bob has received 3 BSV in the outputs and Alice has obtained 1 BSV in change (balance amount). This situation is depicted schematically in FIG. 5 of the accompanying drawings. As each of these component transactions will be submitted to the blockchain rather than a single transaction, for reasons discussed earlier a malign party will not be able to easily deduce the identity of meaning of transactions associated with such request by looking at the public keys or the BSV values in the transactions.

Second Aspect—Sender Implementation

Figure 4B:
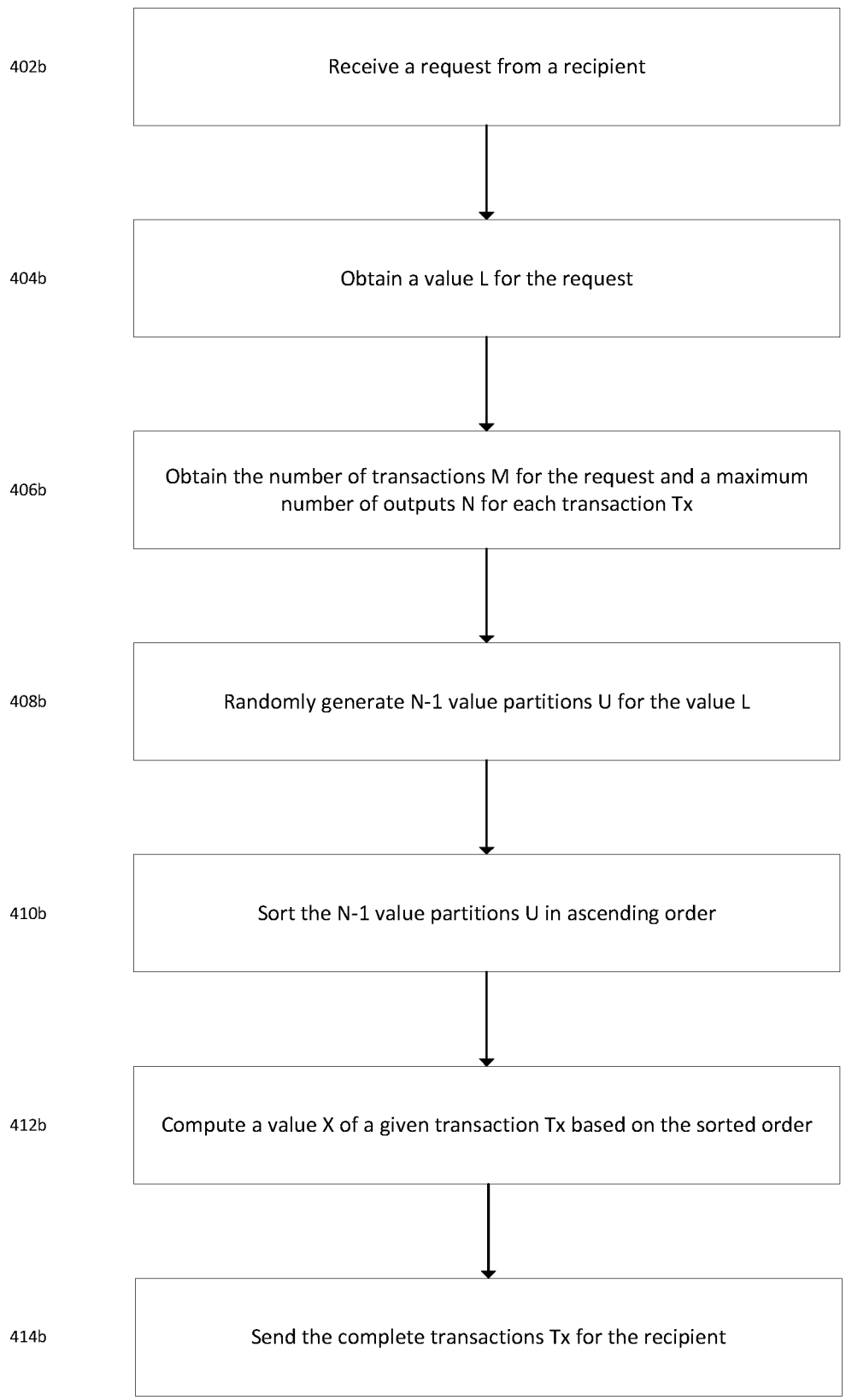
FIG. 4b is a flow diagram depicting a method for distributing a value of a request or a digital asset associated with the request over an arbitrarily selected number of transactions according to a second aspect, the method being performed by one or more processors associated with a sender of a digital asset payment.

FIG. 4b is a flowchart depicting a method of distributing a value if a request according to the second aspect the present disclosure as implemented by one or more processors associated with a sender, i.e. Alice in relation to the above example scenario of paying 3BSV to Bob (the recipient. As discussed above, implementation of the method of the second aspect by one of more processors associated with a sender or indeed a trusted third party for distributing the value of the request so that it is split over multiple transactions and outputs, is advantageous for computationally unsophisticated recipients that may not be able to handling the processing associated with implementing the method themselves. For ease of reference, implementation by one or more processors or a digital wallet associated with the sender is discussed herein.

In step 402b, a request for a payment is received from or on behalf of the recipient. In the above example, this may be a notification or a message that 3BSV is due for goods or services purchased from Bob by Alice. In some embodiments, the request may represent an invoice.

Steps 404b to steps 414b will be implemented by the sender Alice in the same manner as described in steps 402a to steps 412a, respectively, but implemented by the sender. However, in the sender implementation, instead of M' transaction templates Tx, M number of transactions Tx can be straightaway generated for the request in the sender implementation. This is also discussed above in the relevant embodiments related to the second aspect. This is because in this implementation no input or templates are sent from the recipient. Therefore, these steps are not reiterated here to avoid repetition of same concepts of the first aspect.

Third Aspect

Figure 6:
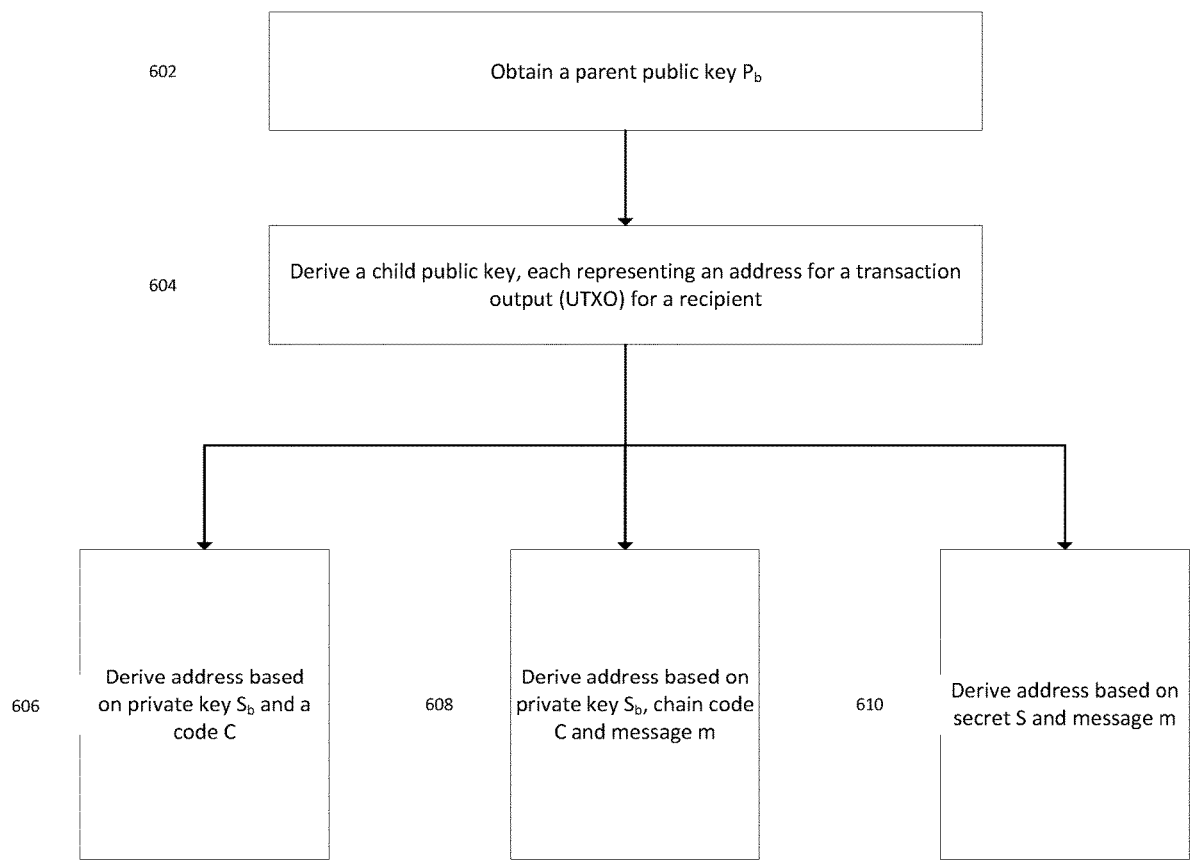
FIG. 6 is a flow diagram depicting a method of securely generating a plurality of public addresses for an entity for use in one or more UTXOs in a public blockchain according to a third aspect, the method being performed by one or more processors associated with a sender or a receiver of a digital asset payment, or a trusted third party.

FIG. 6 is a flowchart depicting a method for generating a plurality of public keys associated with a recipient, each public key represent a public address for the recipient. Once generated, the public keys can then be associated with one or more blockchain transaction outputs (UTXOs) for one or more transactions associated with the recipient. The method of the third aspect may in some embodiments be performed along with the methods of the first and second aspects. For instance, the steps of generating the transaction Tx or transaction templates Tx' (steps 114a and 116b respectively) in FIGS. 1a and 1b require the public address to be provided in the transactions/templates. The method of the third aspect may be used to derive such public addresses associated with the recipient entity so that the payment can be sent to the recipient. As mentioned above, using the method of the third aspect to derive public addresses/public keys for an entity advantageously enables transactions on the public blockchain to be securely and accurately associated or linked with a given entity. In many cases, this will be the recipient entity, but the method is not so limited. A similar technique can be implemented by the sender entity or indeed by a third-party entity as a service offered to the receiver or the sender.

In FIG. 6 step 602 depicts the step of obtaining a parent public key $P_B$ based on a private key $S_B$ associated with a recipient, and a code C. In some embodiments the code C is associated with the recipient. In some embodiments, the parent public and private keys are may be ECDSA keys, i.e. a valid point on the secp256k1 Bitcoin curve, compressed, and hex encoded. However, other blockchains may use other types of curves. Also, it is not essential that the keys as ECDSA keys. The parent keys could also be generalised to any public/private keypair that has a homomorphic property, whereby $S_{Bi}+S_{Bi+1}$ then the corresponding public keys are added $P_{Bi}+P_{Bi+1}$, i.e. homomorphic encryption allows computation on ciphertexts, generating an encrypted result which, when decrypted, matches the result of the operations as if they had been performed on the plaintext.

Step 604 depicts the step of deriving a plurality (n) of child public keys key $P_{Bi(i=1\ to\ n)}$, each based on a respective derived child secret key $S_{Bi(i=1\ to\ n)}$. Each derived child public key $P_{Bi}$ represents a derived public address specific to one more blockchain transaction outputs (UTXOs) associated with the recipient. This derivation can take place in a number of different but related ways as explained in the following steps. Let us consider that the parent key $P_B$ is derived based on $P_B=S_B\cdot G$, where G is a generator or base point on the elliptic curve of bitcoin generator in case of ECDSA keys, or wherein the G is a known constant.

Step 606 depicts one embodiment of deriving the public keys or public address for the entity based on a derivation of child private keys as well as code C. In this embodiment, the code may be a constant that is private to the recipient or shared with the sender or another entity.

In this embodiment, the corresponding ($i^{th}$) child private key for the given child secret key $S_{Bi}$, where i=1 to n is derived by $P_{Bi}=P_B+L_i\cdot G$, where corresponding child key pairs are given by $P_{B_1}=S_{B_1}\cdot G, \ldots, P_{B_n}=S_{B_n}\cdot G$.

Following this computation, a given ($i^{th}$) child private key is derived by $S_{Bi}=S_B+L_i$ mod n where $L_i$=Left 256-bits of $$\begin{cases} HMAC512(C, P_B||i), & \text{where the child private key is not hardened} \\ HMAC512(C, 0\times00||S_B||i), & \text{where the child private key is hardened.} \end{cases}$$

where index i is a 32-bit integer, and where HMAC represents a hash-based message authentication code computation function. This may be based on a known secure hash algorithm.

Thus, this embodiment enables derivation of public address for an entity based on a secret or shared code C and knowledge of the parent secret key. The code may be a chain code. The optional hardening of the child keypair is an added security feature. If the child is hardened, then the knowledge of the child private key and chain code is not enough to reconstruct the private key of the parent. No other entity, besides the recipient is able to construct child addresses as only the recipient knows the secret or private key $S^B$. If the child keypair is not hardened, then an entity with the knowledge of public key $P_B$ and chain code C could construct the derived child keys on the recipient's behalf (like the sender for instance—if needed).

Step 608 depicts an embodiment where in addition to a code C, which may be a chain code or a constant, a message m relating to information or a data item for the request is also used for the derivation. This has the added advantage of determining public address that are linked to a given message for the recipient entity.

Once the data item for the request, i.e. data item or message m associated with the recipient is obtained, the $i^{th}$ derived private child key $P_{Bi(i=1\ to\ n)}$ can be derived based on $S_{Bi}=S_B+HMAC256(L_i, m)$ mod n The corresponding public keys $P_{Bi}$ are given by $P_{Bi}=P_B+HMAC256(L_i, m)\ G$, wherein G is a generator or base point on the elliptic curve of a bitcoin generator or wherein G is a known constant, and wherein m represents a message or a data item associated with the request, the request pertaining to a digital asset.

Step 610 depicts an embodiment where the code C is actually a secret S that is shared by the recipient and another entity, where the other entity is a sender of the digital asset associated with a request to the recipient or a trusted third party associated with the recipient or the sender. In some embodiments the wherein the secret S is shared between the recipient and the other entity based on a known or predefined secure key exchange protocol, i.e. Diffie-Hellman exchange based on the parent public keys for the sender and a recipient $P_A$ and $P_B$.

In this embodiment, the $i^{th}$ child private key is derived by $$S_{B_i} = S_B + HMAC256(S_i, m) \bmod n$$

where $S_i$ = Left 256−bits of $$\begin{cases} HMAC512(S, P_B \| i), & \text{when the child private key is not hardened} \\ HMAC512(S, 0 \times 00 \| S_B \| i), & \text{when the child private key is hardened.} \end{cases}$$

where index i is a 32-bit integer, and where HMAC a hash-based message authentication code computation function.

The corresponding public keys $P_{B_i}$ are given by $P_{B_i} = P_B + HMAC256(S_i, m) \cdot G$.

This embodiment ensures that all transactions associated with the recipient and linked to a given sender for a given message m can be identified and verified is needed. Further, if the derived public keys are not hardened, then sender or party with which the key is shared can also determine and verify the transactions based on the derived public keys for the recipient for a given message m.

In all of the above embodiments of the third aspect, enabling a party other than the recipient to derive the public address for a recipient provides a helpful backup, in case the recipient is compromised. If a trusted third party is also able to derive the addresses, this can also serve as an additional verification or can serve as a disaster recovery or a backup if the recipient and/or sender have been compromised.

Figure 7:
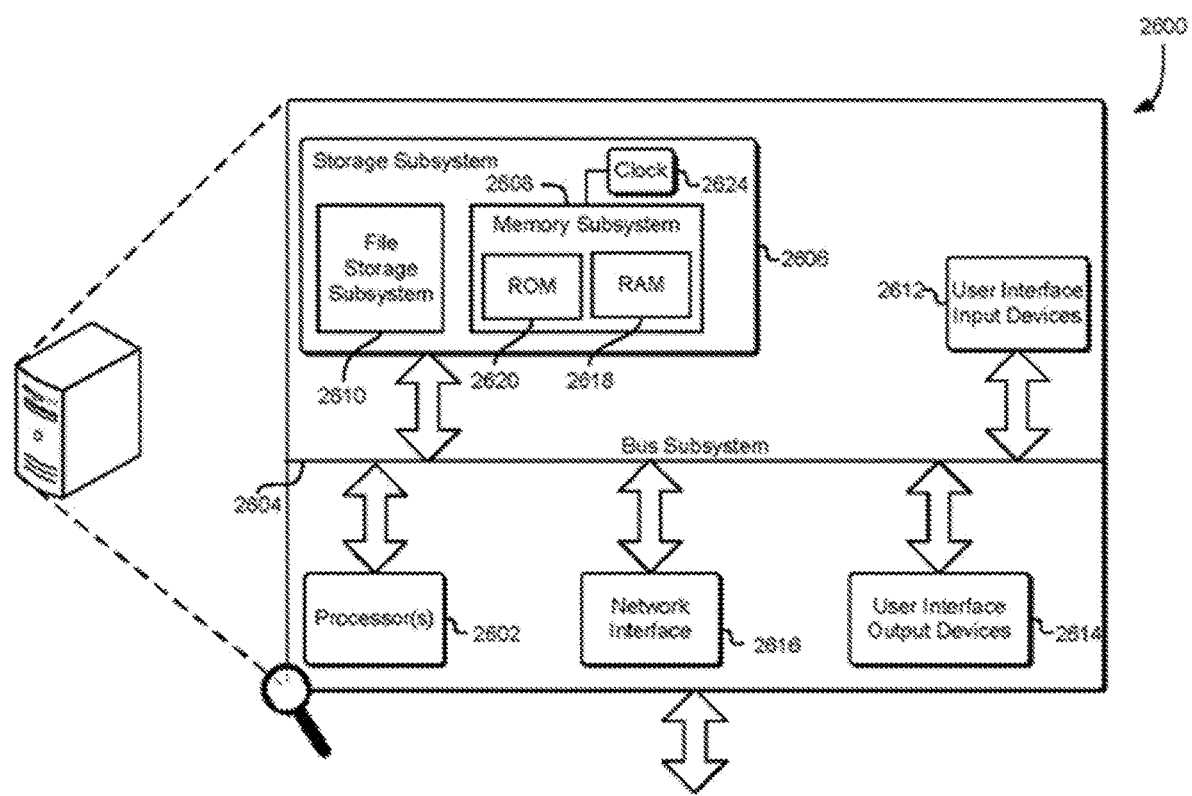
FIG. 7 is a schematic diagram illustrating a computing environment in which various aspects and embodiments of the present disclosure can be implemented.

Turning now to FIG. 7, there is provided an illustrative, simplified block diagram of a computing device 2600 that may be used to practice at least one embodiment of the present disclosure. In various embodiments, the computing device 2600 may be used to implement any of the systems illustrated and described above. For example, the computing device 2600 may be configured to be used as one or more components of DBMS of figure, or the computing device 2600 may be configured to be a client entity that is associated with a given user, the client entity making database requests for a database that is managed by the DBMS of FIG. 6. Thus, computing device 2600 may be a portable computing device, a personal computer, or any electronic computing device. As shown in FIG. 7, the computing device 2600 may include one or more processors with one or more levels of cache memory and a memory controller (collectively labelled 2602) that can be configured to communicate with a storage subsystem 2606 that includes main memory 2608 and persistent storage 2610. The main memory 2608 can include dynamic random-access memory (DRAM) 2618 and read-only memory (ROM) 2620 as shown. The storage subsystem 2606 and the cache memory 2602 and may be used for storage of information, such as details associated with transactions and blocks as described in the present disclosure. The processor(s) 2602 may be utilized to provide the steps or functionality of any embodiment as described in the present disclosure.

The processor(s) 2602 can also communicate with one or more user interface input devices 2612, one or more user interface output devices 2614, and a network interface subsystem 2616.

A bus subsystem 2604 may provide a mechanism for enabling the various components and subsystems of computing device 2600 to communicate with each other as intended. Although the bus subsystem 2604 is shown schematically as a single bus, alternative embodiments of the bus subsystem may utilise multiple buses.

The network interface subsystem 2616 may provide an interface to other computing devices and networks. The network interface subsystem 2616 may serve as an interface for receiving data from, and transmitting data to, other systems from the computing device 2600. For example, the network interface subsystem 2616 may enable a data technician to connect the device to a network such that the data technician may be able to transmit data to the device and receive data from the device while in a remote location, such as a data centre.

The user interface input devices 2612 may include one or more user input devices such as a keyboard; pointing devices such as an integrated mouse, trackball, touchpad, or graphics tablet; a scanner; a barcode scanner; a touch screen incorporated into the display; audio input devices such as voice recognition systems, microphones; and other types of input devices. In general, use of the term "input device" is intended to include all possible types of devices and mechanisms for inputting information to the computing device 2600.

The one or more user interface output devices 2614 may include a display subsystem, a printer, or non-visual displays such as audio output devices, etc. The display subsystem may be a cathode ray tube (CRT), a flat-panel device such as a liquid crystal display (LCD), light emitting diode (LED) display, or a projection or other display device. In general, use of the term "output device" is intended to include all possible types of devices and mechanisms for outputting information from the computing device 2600. The one or more user interface output devices 2614 may be used, for example, to present user interfaces to facilitate user interaction with applications performing processes described and variations therein, when such interaction may be appropriate.

The storage subsystem 2606 may provide a computer-readable storage medium for storing the basic programming and data constructs that may provide the functionality of at least one embodiment of the present disclosure. The applications (programs, code modules, instructions), when executed by one or more processors, may provide the functionality of one or more embodiments of the present disclosure, and may be stored in the storage subsystem 2606. These application modules or instructions may be executed by the one or more processors 2602. The storage subsystem 2606 may additionally provide a repository for storing data used in accordance with the present disclosure. For example, the main memory 2608 and cache memory 2602 can provide volatile storage for program and data. The persistent storage 2610 can provide persistent (non-volatile) storage for program and data and may include flash memory, one or more solid state drives, one or more magnetic hard disk drives, one or more floppy disk drives with associated removable media, one or more optical drives (e.g. CD-ROM or DVD or Blue-Ray) drive with associated removable media, and other like storage media. Such program and data can include programs for carrying out the steps of one or more embodiments as described in the present disclosure as well as data associated with transactions and blocks as described in the present disclosure.

The computing device 2600 may be of various types, including a portable computer device, tablet computer, a workstation, or any other device described below. Additionally, the computing device 2600 may include another device that may be connected to the computing device 2600 through one or more ports (e.g., USB, a headphone jack, Lightning connector, etc.). The device that may be connected to the computing device 2600 may include a plurality of ports configured to accept fibre-optic connectors. Accordingly, this device may be configured to convert optical signals to electrical signals that may be transmitted through the port connecting the device to the computing device 2600 for processing. Due to the ever-changing nature of computers and networks, the description of the computing device 2600 depicted in FIG. 7 is intended only as a specific example for purposes of illustrating the preferred embodiment of the device. Many other configurations having more or fewer components than the system depicted in FIG. 7 are possible.

ENUMERATED EXAMPLE EMBODIMENTS

The present disclosure is hereby discussed based on the following clauses that are related to the above aspects, which are provided herein as exemplary embodiments for better explaining, describing and understanding the claimed aspects and embodiments.

1. A computer implemented method of partitioning a request associated with a digital asset into one or more transactions pertaining to a distributed ledger, each transaction having one or more outputs associated with the request, the method implemented by one or more processors associated with a recipient, the method including the steps of:

obtaining a maximum number of outputs (N) possible for a request associated with the recipient;

for each integer k where 1≤k≤N, determining possible integer partitions;

arbitrarily selecting an integer partition from the determined possible integer partitions for the request;

generating one or more (M') transaction templates Tx' based on the selected integer partition; splitting a value associated with the digital asset across the output(s) associated with the one or more generated transaction templates Tx'; and providing for or to a sender, the one or more generated transaction templates Tx'.

2. The method as set out in clause 1 further comprising receiving one or more completed transactions Tx based on the one or more generated templates Tx' from the sender; and submitting the completed transactions to the distributed ledger.

3. A computer implemented method of partitioning a request into one or more transactions pertaining to a distributed ledger, each transaction having one or more outputs associated with the request, the method is implemented by one or more processors associated with a sender, and includes the steps of:

responsive to receipt of the request from a recipient, obtaining a maximin number of outputs (N) possible for a request associated with the recipient;

for each integer k where 1≤k≤N, determining possible integer partitions;

arbitrarily selecting an integer partition from the determined possible integer partitions for the request;

generating one or more transactions Tx based on the selected integer partition; and splitting a value associated with the digital asset across the output(s) associated with the one or more generated transactions, wherein each output pertains to a public address associated with the recipient.

4. The method as set out in clause 3 further comprising generating or determining the one or more public addresses associated with the recipient based on the selected integer partition, a given public address among the one or more public addresses being assigned to a given output of a given transaction Tx among the one or more generated transactions.

5. The method as set out in any one of clauses 3 or 4 further comprising sending the one or more generated transactions Tx to the sender or submitting the generated transactions Tx to the distributed ledger.

6. The method as set out in any preceding clause wherein the number of transaction templates M' or the number of transactions M generated is based on the number of integers in the selected integer partition.

7. The method as set out in any preceding clause wherein a number of outputs in a given transaction template Tx' or transaction Tx generated is based on a value of an integer at a respective position in the selected integer partition that relates to the given transaction Tx or template Tx'.

8. The method as set out in any preceding clause wherein the maximum number of outputs N is predefined for either the request or the recipient, and wherein the N outputs relate to public addresses that are associated with the recipient.

9. The method as set out in any preceding clause further comprising obtaining a maximum number of transaction templates M'$_{max}$ or a maximum number of transactions M$_{max}$ allowed for the request or the recipient.

10. The method as set out in any preceding clause further comprising obtaining a minimum number of transaction templates M'$_{min}$ or transactions M$_{min}$, and/or a minimum number of outputs N$_{min}$ for the request or the recipient.

11. The method as set out in any preceding clause wherein each output in a given transaction template Tx' or Transaction Tx generated is associated with a different public address for the recipient node, the public address being specific to respective output.

12. A computer implemented method of partitioning a request associated with a digital asset into one or more transactions pertaining to a distributed ledger, each transaction having one or more outputs associated with the request, the method implemented by one or more processors associated with a sender, the method including the steps of:

obtaining or identifying one or more transaction templates Tx' associated with the request, the templates Tx' associated with a recipient and generated based on the method as set out in any one of clauses 1, 2 and 6 to 11;

completing the one or more templates Tx' to create corresponding transactions Tx; and providing the corresponding transactions Tx to the sender or submitting the corresponding transactions to the distributed ledger.

13. A computer implemented method of partitioning a request associated with a digital asset into one or more transactions pertaining to a distributed ledger, each transaction having one or more outputs associated with the request, the method implemented by one or more processors associated with a recipient, the method including the steps of:

providing the request associated to a sender;

receiving one or more completed transactions Tx from the sender, the one or more completed transacted generated based on the method as set out in any one of clauses 3 to 11; and submitting the completed transactions to the distributed ledger.

14. A computer implemented method of distributing a request over one or more transactions pertaining to a distributed ledger, each transaction having one or more outputs associated with the request, the method being implemented by one or more processors associated with a recipient, the method including the steps of:

obtaining a value L associated with the request, wherein the value is representative of a digital asset;

obtaining a predetermined number of transaction templates M' associated with the request, wherein the M' transaction templates Tx' are associated with a predetermined maximum number of outputs N pertaining the request or the recipient, a given transaction template Tx' among the M' transaction templates Tx' having n outputs, where n≤N;

arbitrarily generating n−1 number of value partitions $U_{(i=1 \; to(n-1))}$ of the value L; sorting the n−1 value partitions in ascending order of value $0 < U_{(1)} < U_{(2)} < \ldots < U_{(n-1)} < L$, where $U_{(0)}=0$ and where $U_{(n)}=L$; and computing a value $X_{(i=1 \; to \; M')}$ for a given transaction template among the predetermined number of transaction templates M' based on a difference between a respective ($i^{th}$) value partition and a previous value partition in the sorted order $X_i = U_{(i)} - U_{(i-1)}$ for i=1 to n.

15. The method as set out in clause 14 wherein the step of obtaining includes the method as set out in any one of clauses 1,2 and 6 to 11.

16. The method as set out in clause 1 wherein the step of splitting includes the method as set out in clause 14.

17. A computer implemented method of distributing a request over one or more transactions pertaining to a distributed ledger, each transaction having one or more outputs associated with the request, the method being implemented by one or more processors associated with a sender, the method including the steps of:

responsive to receipt of the request from the recipient, obtaining a value L associated with the request, wherein the value is representative of a digital asset;

obtaining a predetermined number of transactions M associated with the request, wherein the M transactions Tx are associated with a predetermined maximum number of outputs N pertaining the request or the recipient, a given transaction Tx among the M transaction templates Tx having n outputs, where n≤N;

arbitrarily generating n−1 number of value partitions $U_{(i=1 \; to(n-1))}$ of the value L; sorting the n−1 value partitions in ascending order of value $0 < U_{(1)} < U_{(2)} < \ldots < U_{(n-1)} < L$, where $U_{(0)}=0$ and where $U_{(n)}=L$; and computing a value $X_{(i=1 \; to \; M)}$ for a given transaction among the predetermined number of transactions M based on a difference between a respective ($i^{th}$) value partition and a previous value partition in the sorted order $X_i = U_{(i)} - U_{(i-1)}$ for i=1 to n.

18. The method as set out in clause 15 wherein the step of obtaining includes the method as set out in any one of clauses of any one of clauses 3 to 11.

19. The method as set out in clause 3 wherein the step of splitting includes the method as set out in clause 17.

20. The method as set out in any one of clauses 14 to 19 wherein the step of arbitrarily generating n−1 number includes uniformly randomly generate n−1 numbers with $10^{-8}$ precision $(U_1, U_2, \ldots, U_{N-1}) \in (0,1)$.

21. A computer implemented method for generating a plurality of public keys associated with a recipient, each public key associated with one or more blockchain transaction outputs (UTXOs) for one or more transactions associated with the recipient, the method being implemented by one or more processors, the method comprising the steps of:

obtaining a parent public key $P_B$ based on a private key $S_B$ associated with a recipient, and a code C; and deriving a plurality (n) of child public keys key $P_{Bi(i=1 \; to \; n)}$, each based on a respective derived child secret key $S_{Bi(i=1 \; to \; n)}$;

wherein each derived child public key $P_{Bi}$ represents a derived public address specific to one more blockchain transaction outputs (UTXOs) associated with the recipient.

22. The method as set out in clause 21, wherein the recipient is an entity intended to receive a digital asset, and wherein the code C is a code associated with the recipient.

23. The method as set out in any one of clauses 19 or 20 wherein the parent public and/or private key are stable elliptic curve digital signature algorithm (ECDSA) keys.

24. The method as set out in clauses 23 wherein the parent public key $P_B$ is derived based on $P_B = S_B \cdot G$, where G is a generator or base point on the elliptic curve of bitcoin generator or wherein the G is a known constant.

25. A method as set out in clause 24 wherein a corresponding ($i^{th}$) child private key for the given child secret key $S_{B_i}$ is derived by $P_{B_i} = P_B + L_i \cdot G$, where corresponding child key pairs are given by $P_{B_1} = S_{B_1} \cdot G, \ldots, P_B^n = S_{B_n} \cdot G$.

26. The method as set out in any one of clauses 21 to 25 wherein a given ($i^{th}$) child private key is derived by $S_{B_i} = S_B + L_i \mod n$
where $L_i$=Left 256-bits of $$\begin{cases} HMAC512(C, P_B \| i), & \text{where the child private key is not hardened} \\ HMAC512(C, 0 \times 00 \| S_B \| i), & \text{where the child private key is hardened.} \end{cases}$$

where index i is a 32-bit integer, and where HMAC represents a hash-based message authentication code computation function.

27. The method as set out in any one of clauses 21 to 26 further comprising the steps of: obtaining a request m associated with the recipient;

deriving the $i^{th}$ derived private child key $P_{B_{i(i=1 \; to \; n)}}$ based on $S_{B_i} = S_B - HMAC256(L_i, m) \mod n$ 28. The method as set out in clause 27 wherein the corresponding public keys $P_{B_i}$ are given by $P_{B_i} = P_B + HMAC256(L_i, m) G$, wherein G is a generator or base point on the elliptic curve of a bitcoin generator or wherein G is a known constant, and wherein m represent a message or a data item associated with the request, the request pertaining to a digital asset.

29. The method as set out in any one of clauses 21 to 28 wherein the code C is a chain code that is secret or private to the recipient, and wherein the chain code C is optionally a secure hash of a secret seed associated with the recipient.
30. The method as set out in any one of clauses 21 to 28 wherein the code C is a chain code that is shared with another entity, wherein the other entity is a sender of the digital asset associated with the request to the recipient, or wherein the other entity is a trusted third party associated with the recipient or the sender.
31. The method as set out in any one of clauses 27 or 28 wherein the code C is associated with a secret S that is shared by the recipient and another entity, wherein the other entity is a sender of the digital asset associated with a request to the recipient or wherein the other entity is a trusted third party associated with the recipient or the sender, wherein the secret S is shared between the recipient and the other entity based on a known or predefined secure key exchange protocol based on the parent public keys for the sender and a recipient $P_A$ and $P_B$.
32. The method as set out in clause 31 wherein the $i^{th}$ child private key is derived by $S_{B_i} = S_B + HMAC256(S_i, m) \mod n$
where $S_i$ = Left 256−bits of $$\begin{cases} HMAC512(S, P_B \| i), & \text{when the child private key is not hardened} \\ HMAC512(S, 0 \times 00 \| S_B \| i), & \text{when the child private key is hardened.} \end{cases}$$

where index i is a 32-bit integer, and where HMAC a hash-based message authentication code computation function.
33. The method as set out in clause 32 wherein corresponding public keys $P_{B_i}$ are given by $P_{B_i} = P_B + HMAC256 (S_i, m) G$.
34. The method as set out in any one of clauses 21 to 33 wherein the one or more processors implementing the method is associated with the recipient.
35. The method as set out in clause 34 wherein the one or more processors is associated with a digital wallet of the recipient.
36. The method as set out in any one of clauses 21 to 35 wherein the derived public addresses are assigned to one of more outputs of one or more transaction templates Tx' that are arbitrarily generated for the recipient according to the method of any one of clauses 1, 2, 6 to 11, 14 to 16 and 20.
37. The method as set out in any one of clauses 1, 2, 6 to 11 and 14 to 16 further comprising the method as set out in any one of clauses 21 to 35.
38. The method as set out in any one of clauses 30 to 33 wherein the one or more processors implementing the method is associated with a sender or a trusted third-party entity, the method further including receiving or obtaining the shared chain code C or secret S associated with the recipient.
39. The method as set out in clause 38 wherein the one or more processors is associated with a digital wallet of the sender.
40. The method as set out in any one of clauses 30 to 33, 38 and 39 wherein the derived public addresses are assigned to one of more outputs of one or more transactions Tx that are arbitrary generated by the sender for the recipient according to the method as set out in any one of clauses 3 to 11 and 17 to 20.
41. The method as set out in any one of clauses 3 to 11 and 17 to 20 further comprising the method as set out in any one of clauses 21 to 33, 38 and 39.
42. A computing device comprising a processor and memory, the memory including executable instructions that, as a result of execution by the processor, causes the device to perform the computer-implemented method as set out in any one of clauses 1, 2, 6 to 11, 13 to 16 and 21 to 37, the computing device pertaining to a recipient or a digital wallet associated with the recipient.
43. A computing device comprising a processor and memory, the memory including executable instructions that, as a result of execution by the processor, causes the device to perform the computer-implemented method as set out in any one of clauses 3 to 12, 17 to 33, 38 and 39, the computing device pertaining to a sender or a digital wallet associated with the sender.
44. A computer-readable storage medium having stored thereon executable instructions that, as a result of being executed by a processor of a computer system, cause the computer system to perform the method of any one of clauses 1, 2, 6 to 11, 13 to 16 and 21 to 37 to implement the recipient or a digital wallet associated with the recipient.
45. A computer-readable storage medium having stored thereon executable instructions that, as a result of being executed by a processor of a computer system, cause the computer system to perform the method of any one of clauses 3 to 12, 17 to 33, 38 and 39 to implement the sender or a digital wallet associated with the sender.

It should be noted that the above-mentioned aspects and embodiments illustrate rather than limit the disclosure, and that those skilled in the art will be capable of designing many alternative embodiments without departing from the scope of the disclosure as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. In the present specification, "comprises" means "includes or consists of" and "comprising" means "including or consisting of". The singular reference of an element does not exclude the plural reference of such elements and vice-versa. The disclosure may be implemented by means of hardware comprising several distinct elements, and by means of a suitably programmed computer. In a device claim enumerating several means, several of these means may be embodied by one and the same item of hardware. The mere fact that certain measures are recited in mutually different dependent claims does not indicate that a combination of these measures cannot be used to advantage.

The invention claimed is:
1. A computer implemented method of partitioning a request associated with a digital asset into one or more transactions pertaining to a distributed ledger, each transaction having one or more outputs associated with the request, the method implemented by one or more processors associated with a recipient, the method comprising the steps of:
obtaining a maximum number of outputs (N) possible for a request associated with the recipient;
for each integer k where, 1≤k≤N determining possible integer partitions;

arbitrarily selecting an integer partition from the determined possible integer partitions for the request;
generating one or more (M') transaction templates Tx' based on the selected integer partition;
splitting a value associated with the digital asset across output(s) associated with the one or more generated transaction templates Tx'; and
providing for or to a sender, the one or more generated transaction templates Tx'; and
wherein the step of splitting includes the steps of:
obtaining a value L associated with the request, wherein the value is representative of a digital asset;
obtaining a predetermined number of transaction templates M' associated with the request, wherein the M' transaction templates Tx' are associated with a predetermined maximum number of outputs N pertaining the request or the recipient, a given transaction template Tx' among the M' transaction templates Tx' having n outputs, where n≤N;
arbitrarily generating n−1 number of value partitions $U_{(i=1\ to(n-1))}$ of the value L;
sorting the n−1 value partitions in ascending order of value $0<U_{(1)}<U_{(2)}< \ldots <U_{(n-1)}<L$, where $U_{(0)}=0$ and where $U_{(n)}=L$; and
computing a value $X_{(i=1\ to\ M')}$ for a given transaction template among the predetermined number of transaction templates M' based on a difference between a respective ($i^{th}$) value partition and a previous value partition in the sorted order $X_i = U_{(i)} - U_{(i-1)}$ for i=1 to n.

2. The method of claim 1, further comprising receiving one or more completed transactions Tx based on the one or more generated templates Tx' from the sender; and submitting the completed transactions to the distributed ledger.

3. The method of claim 1, wherein the number of transaction templates M' or the number of transactions M generated is based on the number of integers in the selected integer partition; and/or wherein a number of outputs in a given transaction template Tx' or transaction Tx generated is based on a value of an integer at a respective position in the selected integer partition that relates to the given transaction Tx or template Tx'; and/or the method further comprising obtaining a maximum number of transaction templates $M'_{max}$ or a maximum number of transactions $M_{max}$ allowed for the request or the recipient; and/or the method further comprising obtaining a minimum number of transaction templates $M'_{min}$ or transactions $M_{min}$, and/or a minimum number of outputs $N_{min}$ for the request or the recipient; and/or wherein each output in a given transaction template Tx' or Transaction Tx generated is associated with a different public address for the recipient, the public address being specific to respective output.

4. The method of claim 1, further comprising the steps of:
providing the request to a sender;
receiving one or more completed transactions Tx from the sender, the one or more completed transacted generated by performing the steps of:
responsive to receipt of the request from a recipient, obtaining a maximin number of outputs (N) possible for a request associated with the recipient;
for each integer k where 1≤k≤N, determining possible integer partitions;
arbitrarily selecting an integer partition from the determined possible integer partitions for the request;
generating one or more transactions Tx based on the selected integer partition; and
splitting a value associated with the digital asset across the output(s) associated with the one or more generated transactions, wherein each output pertains to a public address associated with the recipient; and
submitting the completed transactions to the distributed ledger.

5. A computing device, comprising a processor and memory or a non-transitory storage medium, the memory or the non-transitory storage medium including executable instructions that, as a result of execution by the processor, causes the device to perform a computer implemented method of partitioning a request associated with a digital asset into one or more transactions pertaining to a distributed ledger, each transaction having one or more outputs associated with the request, the method implemented by one or more processors associated with a recipient, the method including the steps of:
obtaining a maximum number of outputs (N) possible for a request associated with the recipient;
for each integer k where, 1≤k≤N determining possible integer partitions;
arbitrarily selecting an integer partition from the determined possible integer partitions for the request;
generating one or more (M') transaction templates Tx' based on the selected integer partition;
splitting a value associated with the digital asset across output(s) associated with the one or more generated transaction templates Tx'; and
providing for or to a sender, the one or more generated transaction templates Tx', the computing device pertaining to the recipient or a digital wallet associated with the recipient; and
wherein the step of splitting includes the steps of:
obtaining a value L associated with the request, wherein the value is representative of a digital asset;
obtaining a predetermined number of transaction templates M' associated with the request, wherein the M' transaction templates Tx' are associated with a predetermined maximum number of outputs N pertaining the request or the recipient, a given transaction template Tx' among the M' transaction templates Tx' having n outputs, where n≤N;
arbitrarily generating n−1 number of value partitions $U_{(i=1\ to(n-1))}$ of the value L;
sorting the n−1 value partitions in ascending order of value $0<U_{(1)}<U_{(2)}< \ldots <U_{(n-1)}<L$, where $U_{(0)}=0$ and where $U_{(n)}=L$; and
computing a value $X_{(i=1\ to\ M')}$ for a given transaction template among the predetermined number of transaction templates M' based on a difference between a respective ($i^{th}$) value partition and a previous value partition in the sorted order $X_i = U_{(i)} - U_{(i-1)}$ for i=1 to n.

* * * * *